United States Patent
Eger et al.

(10) Patent No.: US 11,563,615 B2
(45) Date of Patent: Jan. 24, 2023

(54) ITERATIVE REFERENCE SIGNAL SYMBOL RECONSTRUCTION AND CHANNEL ESTIMATION

(71) Applicant: QUALCOMM Incorporated, San Diego, CA (US)

(72) Inventors: Ory Eger, Tel Aviv (IL); Assaf Touboul, Netanya (IL); Yehonatan Dallal, Kfar Saba (IL); Noam Zach, Kiryat Ono (IL); Sharon Levy, Binyamina (IL); Guy Wolf, Rosh Haayin (IL); Shay Landis, Hod Hasharon (IL); Ran Berliner, Kfar-Aviv (IL); Jacob Pick, Belt Zeit (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/211,557

(22) Filed: Mar. 24, 2021

(65) Prior Publication Data
US 2021/0306194 A1    Sep. 30, 2021

Related U.S. Application Data

(60) Provisional application No. 63/001,102, filed on Mar. 27, 2020.

(51) Int. Cl.
*H04W 72/04* (2009.01)
*H04L 27/26* (2006.01)
(Continued)

(52) U.S. Cl.
CPC ...... *H04L 27/2623* (2013.01); *H04L 25/0224* (2013.01); *H04L 5/0048* (2013.01); *H04W 72/04* (2013.01)

(58) Field of Classification Search
CPC ............. H04L 27/2623; H04L 27/2636; H04L 1/1819; H04L 1/1867; H04L 25/03146;
(Continued)

(56) References Cited

U.S. PATENT DOCUMENTS

2006/0215537 A1    9/2006  Wu et al.
2013/0177089 A1*   7/2013  Al-Safadi ........... H04L 27/2624
                                                       375/260
(Continued)

OTHER PUBLICATIONS

Anum A., et al., "Receiver Based PAPR Reduction in OFDMA", 2014 IEEE International Conference on Acoustics, Speech and Signal Processing (ICASSP), IEEE, May 4, 2014 (May 4, 2014), pp. 8087-8091, XP032617519, DOI: 10.1109/ICASSP.2014.6855176 [retrieved on Jul. 11, 2014] section 2 and section 4.
(Continued)

*Primary Examiner* — Eva Y Puente
(74) *Attorney, Agent, or Firm* — Qualcomm Incorporated

(57) ABSTRACT

Methods, systems, and devices for wireless communications are described. A transmitting device (e.g., a user equipment (UE) or base station) may reduce a peak to average power ratio (PAPR) by clipping signals transmitted to a receiving device according to a clipping level. The receiving device may receive, from the transmitting device, an indication of the clipping level associated with a reference signal. The receiving device may receive the reference signal and identify distortions based on the clipping level. The receiving device may iteratively reconstruct peaks of the clipped reference signal until the receiving device is able to obtain accurate pilot symbols for use in channel estimation. The techniques described herein may enable receiving devices to improve efficiency and reliability of communications by improving channel estimation, which may increase the probability of successfully decoding transmitted information.

46 Claims, 17 Drawing Sheets

(51) Int. Cl.
*H04L 25/02* (2006.01)
*H04L 5/00* (2006.01)

(58) Field of Classification Search
CPC ............ H04L 25/03828; H04L 25/067; H04L 27/2602; H04L 27/2634; H04L 25/03171; H04L 5/0039; H04L 1/0071; H04L 1/0041; H04L 1/0057; H04L 27/2614; H04L 27/2626; H04L 27/2647; H04L 5/0048; H04L 27/2618; H04L 5/0007; H04L 5/0053; H04L 27/26; H04L 27/2613; H04W 72/04; H04W 28/04; H04W 72/06
USPC ......................................................... 375/297
See application file for complete search history.

(56) References Cited

U.S. PATENT DOCUMENTS

| | | | | |
|---|---|---|---|---|
| 2013/0265973 | A1* | 10/2013 | Nakamura | H04L 27/2634 370/329 |
| 2015/0029981 | A1* | 1/2015 | Takahashi | H04W 72/1278 370/329 |
| 2021/0234740 | A1* | 7/2021 | Eger | H04L 25/067 |
| 2021/0266196 | A1* | 8/2021 | Liu | H04L 5/0048 |

OTHER PUBLICATIONS

Chen Y., et al., "Clipping Noise Compensation for OFDMA Systems", Communications Theory Workshop, 2009, AUSCTW 2009, Australian, IEEE, Piscataway, NJ, USA, Feb. 4, 2009 (Feb. 4, 2009), pp. 100-104, XP031444513, ISBN: 978-1-4244-3356-8 section 3.
International Search Report and Written Opinion—PCT/US2021/024084—ISA/EPO—dated Jul. 7, 2021 (201790WO).
Kim D., et al., "Clipping Noise Mitigation for OFDM by Decision-Aided Reconstruction", IEEE Communications Letters, IEEE Service Center, Piscataway, NJ. US, vol. 3, No. 1. Jan. 1, 1999 (Jan. 1, 1999), pp. 4-6, XP011429716. ISSN: 1089-7798, DOI: 10.1109/4234.740112 section 2 and section 3.
Ma X., et al., "Iterative Channel Estimation for OFDM with Clipping", Wireless Personal Multimedia Communications, 2002. The 5th International AI Symposium on, Oct. 27-30, 2002, IEEE, Piscataway, NJ, USA, vol. 3. Oct. 27, 2002 (Oct. 27, 2002), pp. 1304-1308, XP010619304, ISBN: 978-0-7803-7442-3, p. 1304 p. 1306, right column.

* cited by examiner

ITERATIVE REFERENCE SIGNAL SYMBOL RECONSTRUCTION AND CHANNEL ESTIMATION

CROSS REFERENCE

The present Application for Patent claims the benefit of U.S. Provisional Patent Application No. 63/001,102 by EGER et al., entitled "ITERATIVE REFERENCE SIGNAL SYMBOL RECONSTRUCTION AND CHANNEL ESTIMATION" and filed Mar. 27, 2020, which is assigned to the assignee hereof and expressly incorporated by reference herein.

FIELD OF TECHNOLOGY

The following relates generally to wireless communications and more specifically to iterative reference signal symbol reconstruction and channel estimation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A signal transmitted by a base station or a UE may have an associated peak to average power ratio (PAPR). As PAPR increases, the efficiency of a power amplifier amplifying the signal (e.g., a ratio of an output power to an input power for the power amplifier) may decrease. Devices with inefficient power amplifiers may consume more power or have other performance drawbacks.

SUMMARY

The described techniques relate to improved methods, systems, devices, and apparatuses that support iterative reference signal symbol reconstruction and channel estimation. Generally, the described techniques provide for enabling a receiving device (e.g., a user equipment (UE) or base station) to iteratively reconstruct peaks of a clipped reference signal (e.g., a demodulation reference signal (DMRS)) to perform channel estimation. A transmitting device may reduce a peak to average power ratio (PAPR) by clipping signals transmitted to the receiving device according to a clipping level (e.g., by removing peaks from the signals, where a peak may be a portion of a signal that is above (or below) an amplitude threshold corresponding to the clipping level, such as a voltage threshold, a current threshold, or a power threshold). The receiving device may receive, from the transmitting device, an indication of a clipping level associated with a reference signal. The receiving device may receive the reference signal and identify distortions associated with the reference signal based on the clipping level. The receiving device may perform a reconstruction procedure which may include iteratively reconstructing peaks of the clipped reference signal until the receiving device is able to obtain accurate pilot symbols for use in channel estimation. In some examples, the receiving device may report, to the transmitting device, a capability of performing iterative reference signal reconstruction and channel estimation by transmitting a capability indicator. The techniques described herein may enable receiving devices to improve efficiency and reliability of communications by improving channel estimation, which may increase the probability of successfully decoding transmitted information.

A method of wireless communications at a receiving device is described. The method may include receiving, from a transmitting device, an indication of a clipping level associated with a reference signal, receiving the reference signal from the transmitting device, where the reference signal is distorted based on the clipping level, performing a reconstruction procedure for the reference signal based on the indication of the clipping level, where the reconstruction procedure includes one or more iterations, determining a channel estimate associated with the reference signal based on the reconstruction procedure, and communicating with the transmitting device based on the channel estimate.

An apparatus for wireless communications at a receiving device is described. The apparatus may include a processor, memory coupled with the processor, and instructions stored in the memory. The instructions may be executable by the processor to cause the apparatus to receive, from a transmitting device, an indication of a clipping level associated with a reference signal, receive the reference signal from the transmitting device, where the reference signal is distorted based on the clipping level, perform a reconstruction procedure for the reference signal based on the indication of the clipping level, where the reconstruction procedure includes one or more iterations, determine a channel estimate associated with the reference signal based on the reconstruction procedure, and communicate with the transmitting device based on the channel estimate.

Another apparatus for wireless communications at a receiving device is described. The apparatus may include means for receiving, from a transmitting device, an indication of a clipping level associated with a reference signal, receiving the reference signal from the transmitting device, where the reference signal is distorted based on the clipping level, performing a reconstruction procedure for the reference signal based on the indication of the clipping level, where the reconstruction procedure includes one or more iterations, determining a channel estimate associated with the reference signal based on the reconstruction procedure, and communicating with the transmitting device based on the channel estimate.

A non-transitory computer-readable medium storing code for wireless communications at a receiving device is described. The code may include instructions executable by a processor to receive, from a transmitting device, an indication of a clipping level associated with a reference signal, receive the reference signal from the transmitting device, where the reference signal is distorted based on the clipping level, perform a reconstruction procedure for the reference signal based on the indication of the clipping level, where the reconstruction procedure includes one or more iterations, determine a channel estimate associated with the reference signal based on the reconstruction procedure, and communicate with the transmitting device based on the channel estimate.

A method of wireless communications at a transmitting device is described. The method may include identifying a clipping level associated with a reference signal for transmission to a receiving device, transmitting an indication of the clipping level to the receiving device, generating the reference signal, where the reference signal is distorted based on the clipping level, and transmitting the reference signal to the receiving device.

An apparatus for wireless communications at a transmitting device is described. The apparatus may include a processor, memory coupled with the processor, and instructions stored in the memory. The instructions may be executable by the processor to cause the apparatus to identify a clipping level associated with a reference signal for transmission to a receiving device, transmit an indication of the clipping level to the receiving device, generate the reference signal, where the reference signal is distorted based on the clipping level, and transmit the reference signal to the receiving device.

Another apparatus for wireless communications at a transmitting device is described. The apparatus may include means for identifying a clipping level associated with a reference signal for transmission to a receiving device, transmitting an indication of the clipping level to the receiving device, generating the reference signal, where the reference signal is distorted based on the clipping level, and transmitting the reference signal to the receiving device.

A non-transitory computer-readable medium storing code for wireless communications at a transmitting device is described. The code may include instructions executable by a processor to identify a clipping level associated with a reference signal for transmission to a receiving device, transmit an indication of the clipping level to the receiving device, generate the reference signal, where the reference signal is distorted based on the clipping level, and transmit the reference signal to the receiving device.

DETAILED DESCRIPTION

Figure 1:
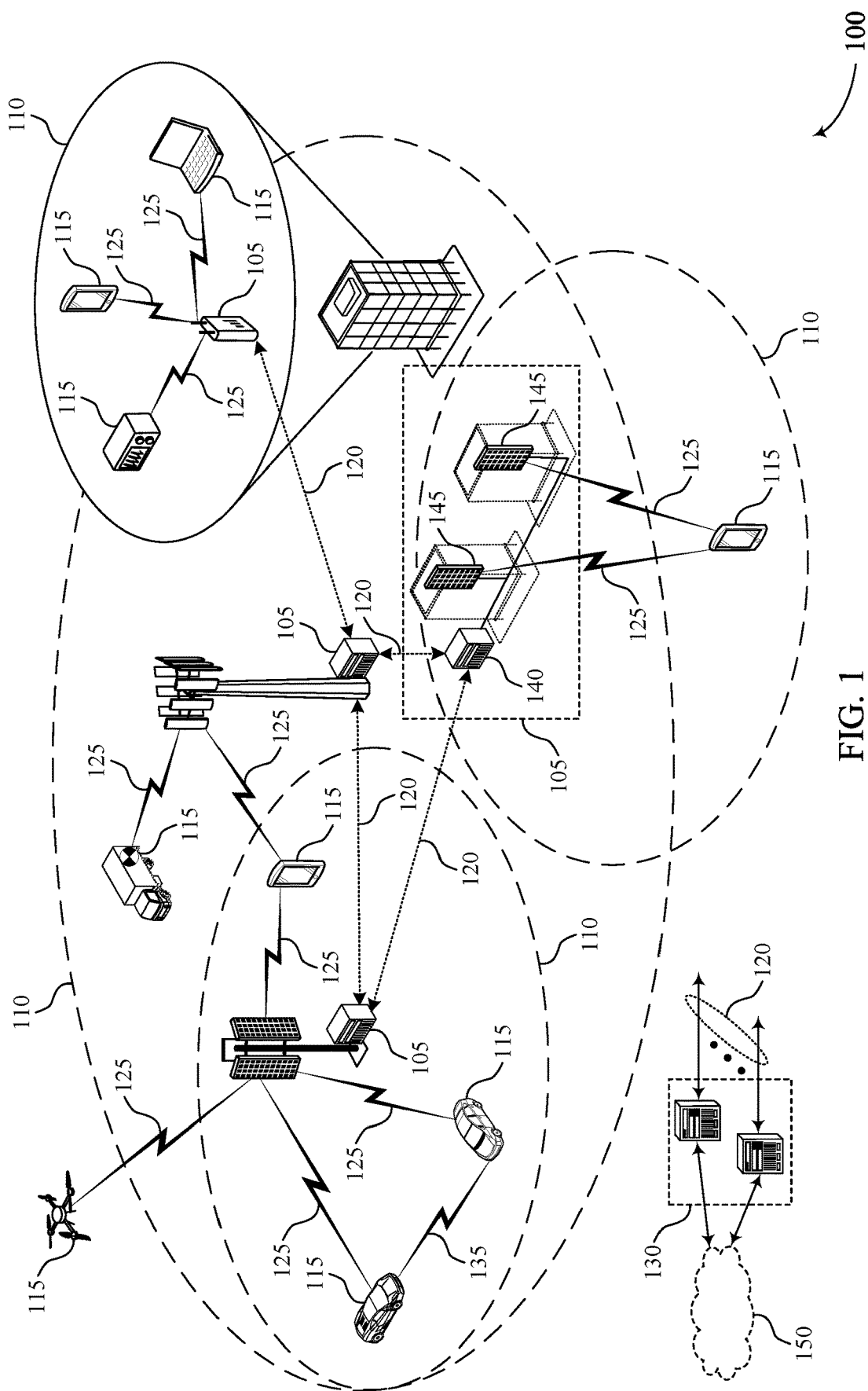
FIGS. 1 and 2 illustrate examples of a wireless communications system that supports iterative reference signal symbol reconstruction and channel estimation in accordance with aspects of the present disclosure.

In some examples, a transmitting device may transmit signals with a higher peak to average power ratio (PAPR) than desired. As just one example, the use of orthogonal frequency division multiple access (OFDMA) techniques may in some cases increase PAPR relative to the use of single carrier techniques. Transmitting signals with a higher PAPR may cause a power amplifier at a transmitting device to operate with decreased efficiency (e.g., a decreased ratio of output power to input power), which may lead to the transmitting device consuming more power, among other drawbacks that may be appreciated by one of ordinary skill in the art. Accordingly, reducing PAPR may increase efficiency at the transmitting device, among other benefits that may be appreciated by one of ordinary skill in the art.

Methods of reducing PAPR may include clipping or chopping off each peak of a signal that exceeds (e.g., is above) a clipping level, which may also be referred to as a clipping threshold, and may correspond to an amplitude threshold in some domain (e.g., a voltage domain, a current domain, a power domain, a signal constellation domain). For example, modulation symbols corresponding to peaks of the signal may be replaced with modulation symbols corresponding to a signal level that is at or below the clipping level. Additionally, a transmitting device may send a peak suppression information message (PSIM) indicating information related to the clipped signal. The PSIM may enable a device that receives the clipped signal to at least partially reconstruct the original signal, which may in turn allow for accurate decoding. In some examples, a reference signal (e.g., a demodulation reference signal (DMRS)) may be clipped based on the clipping level, which may degrade channel estimation performance at a receiving device. For example, the reference signal may be distorted based on replacing peaks with configured values. Degraded channel estimation performance may result in an increased error vector magnitude (EVM). As a result, the receiving device may fail to decode data signals associated with the clipped reference signal, which may reduce communications reliability at the receiving device.

Methods and related structures that may increase a capability of a receiving device to accurately perform channel estimation based on iteratively reconstructing a received clipped reference signal are described herein. The receiving device may receive, from a transmitting device, an indication of a clipping level associated with a reference signal. The receiving device may receive the reference signal and identify distortions based on the clipping level. The receiving device may perform a reconstruction procedure, which may include iteratively reconstructing peaks of the clipped reference signal until the receiving device is able to obtain accurate pilot symbols for use in channel estimation. In some examples, the receiving device may report, to the transmitting device, a capability of performing iterative reference signal reconstruction and channel estimation, for example, by transmitting a capability indicator. The techniques described herein may enable receiving devices to improve efficiency and reliability of communications by improving channel estimation, which may increase the probability of successfully decoding transmitted information. In the context of DMRS or other reference signals, the net benefits of techniques such as those described herein may be enhanced, for example, because symbols of the reference signals (e.g., a reference sequence of symbols) may be known a priori, and thus the accuracy of peaks reconstruction may be improved.

Aspects of the disclosure are initially described in the context of wireless communications systems. Additional aspects of the disclosure are described in the context of a signal reconstruction scheme, devices, and a process flow. Aspects of the disclosure are further illustrated by and described with reference to apparatus diagrams, system diagrams, and flowcharts that relate to iterative reference signal symbol reconstruction and channel estimation.

FIG. 1 illustrates an example of a wireless communications system 100 that supports iterative reference signal symbol reconstruction and channel estimation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a user equipment (UE) 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting.

MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A transmitting device (e.g., a base station 105, a UE 115, etc.) may reduce PAPR by clipping signals transmitted to a receiving device (e.g., a base station 105, a UE 115, etc.) according to a clipping level. The receiving device may receive, from the transmitting device, an indication of a clipping level associated with a reference signal. The receiving device may receive the reference signal and identify distortions therein based on the clipping level. The receiving device may perform a reconstruction procedure which may include iteratively reconstructing peaks of the clipped reference signal until the receiving device is able to obtain accurate pilot symbols for use in channel estimation. In some examples, the receiving device may report, to the transmitting device, a capability of performing iterative reference signal reconstruction and channel estimation, for example, by transmitting a capability indicator. The techniques described herein may enable receiving devices to improve efficiency and reliability of communications by improving channel estimation, which may increase the probability of successfully decoding transmitted information.

Figure 2:
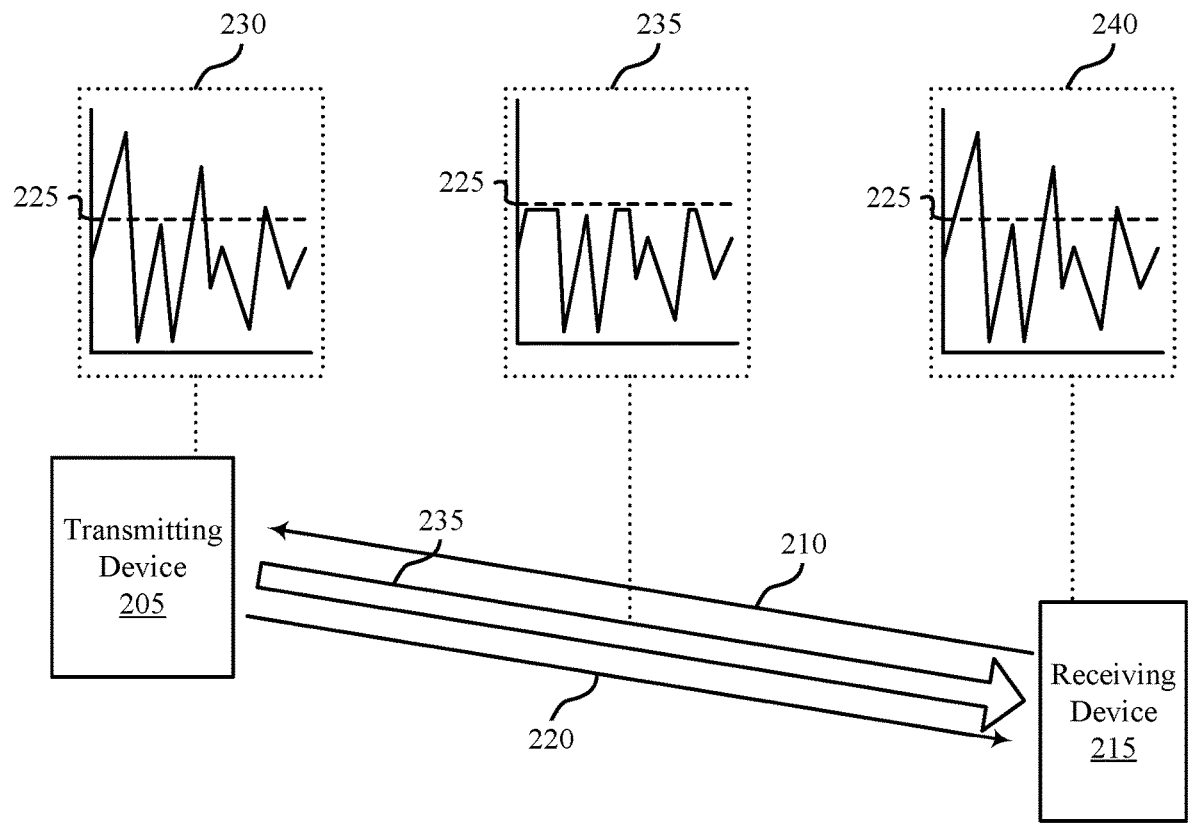

FIG. 2 illustrates an example of a wireless communications system 200 in accordance with aspects of the present disclosure. In some examples, wireless communications system 200 may implement aspects of wireless communications system 100. For example, the wireless communications system 200 may include a transmitting device 205 and a receiving device 215, which may be examples of a UE 115 or a base station 105 as described with reference to FIG. 1.

The transmitting device 205 may generate a reference signal 230 with multiple peaks (e.g., samples or symbols corresponding to an amplitude) that exceed (e.g., are above) a clipping level 225. To reduce a PAPR of the reference signal 230, the transmitting device 205 may clip (e.g., chop off or otherwise eliminate or replace) peaks of the reference signal 230 above the clipping level 225. The transmitting device 205 and may replace the clipped portions of the reference signal with samples or symbols that correspond to an amplitude at or below (at least in terms of absolute value) the clipping level 225. Clipping may occur in the time domain or the frequency domain. Clipping peaks of the reference signal 230 may result in the clipped reference signal 235. The transmitting device 205 may transmit the clipped reference signal 235 to the receiving device 215. In some examples, the transmitting device 205 may transmit the clipped reference signal 235 on a control channel (e.g., a physical downlink control channel (PDCCH)) or multiplexed on a data channel (e.g., a physical downlink shared channel (PDSCH)).

The receiving device 215, upon receiving the clipped reference signal 235, may perform one or more procedures to generate a reconstructed reference signal 240, which may be an approximate reconstruction of the reference signal 230. The receiving device 215 may perform the one or more procedures because the clipped reference signal 235 with chopped peaks may have blurrier or less easily decipherable constellations compared to the reconstructed reference signal 240 with reconstructed peaks, which may reduce a reliability of a channel estimation and degrade system performance. The one or more procedures may involve the receiving device 215 receiving control signaling 220 that indicates the clipping level 225. In some examples, the transmitting device 205 may transmit the control signaling 220 via a control channel (e.g., a PDCCH or a dedicated control channel) or in a control message multiplexed on a data channel. For example, the reference signal 230 may include a DMRS scheduled in a PDCCH transmission, and the transmitting device 205 may include the clipped reference signal 235 in the scheduled PDCCH transmission. Additionally or alternatively, the reference signal 230 may include a reference signal scheduled in a PDSCH transmission, and the transmitting device 205 may multiplex the clipped reference signal 235 in one or more symbols of the scheduled PDSCH transmission.

The one or more procedures may further involve the receiving device 215 performing an iterative reference signal reconstruction procedure. In some examples, the receiving device 215 may iteratively reconstruct peaks of the clipped reference signal 235 until the receiving device 215 is able to obtain accurate pilot symbols for use in channel estimation. The iterative reference signal reconstruction procedure is further described with reference to FIGS. 3 and 4.

In some examples, the receiving device 215 may transmit, to the transmitting device 205, a capability indicator 210 indicating a capability of the receiving device 215 to perform iterative reference signal reconstruction. In such examples, the receiving device 215 may transmit the capability indicator 210 via a control channel (e.g., a physical uplink control channel (PUCCH) or a dedicated control channel) or in a control message multiplexed on a data channel.

In some examples, the transmitting device 205 may transmit additional signaling (not shown) associated with (e.g., to be decoded based on or otherwise considered in conjunction with) the clipped reference signal 235. Such additional signaling may include control signaling (e.g., transmitted via a PDCCH), data (e.g., transmitted via a PDSCH), or any combination thereof. The additional signaling may be clipped according to the clipping level 225 to reduce a PAPR of the signaling. In some examples, the control signaling may include a PSIM identifying amplitudes and locations of clipped peaks in the data, which may enable the receiving device 215 to at least partially reconstruct the data in the signaling based on the clipping level 225. The receiving device 215 may perform channel estimation based on the reconstructed reference signal 240 to process and decode the data signaling.

The techniques described herein may enable the receiving device 215 to improve efficiency and reliability of communications by improving channel estimation, which may increase the probability of successfully decoding information transmitted by the transmitting device 205.

Figure 3:
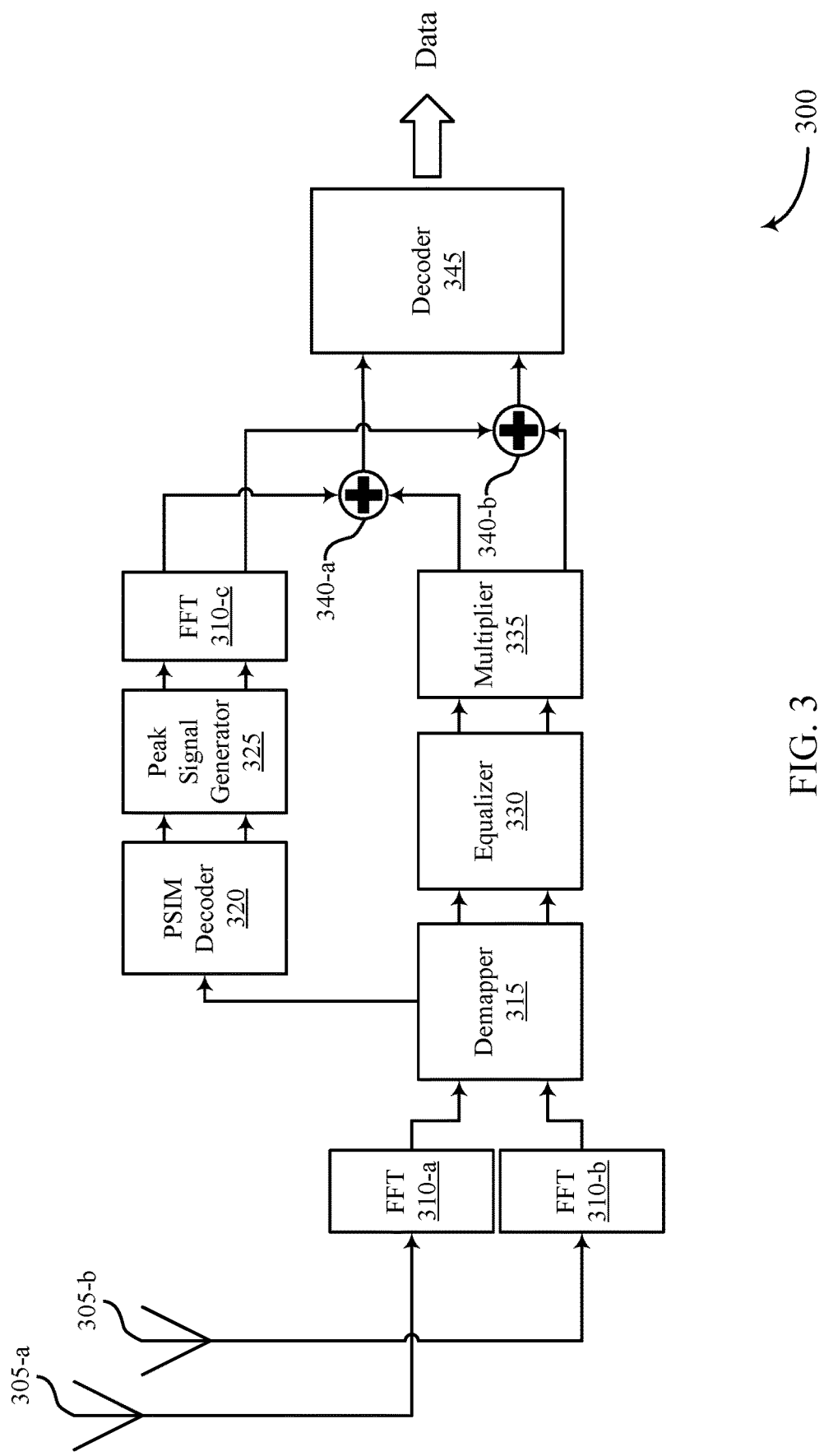
FIG. 3 illustrates an example of a device that supports iterative reference signal symbol reconstruction and channel estimation in accordance with aspects of the present disclosure.

FIG. 3 illustrates an example of a device 300 that supports iterative reference signal symbol reconstruction and channel estimation in accordance with aspects of the present disclosure. In some examples, the device 300 may implement aspects of wireless communication systems 100 and 200. For example, the device 300 may be an example of a receiving device 215 described with reference to FIG. 2 and/or a UE 115 or a base station 105 described with reference to FIG. 1.

The device 300 may receive signaling from a transmitting device (e.g., a UE 115 or a base station 105) at one or more antennas 305 (e.g., an antenna 305-a and an antenna 305-b). The signaling may include a waveform in a time domain which represents one or more symbols in a frequency domain, where the symbols may correspond to control signaling (e.g., transmitted via a PDCCH), data (e.g., transmitted via a PDSCH), a reference signal (e.g., a DMRS), a precoding matrix indicator (PMI), or any combination thereof. The signaling may be clipped according to a clipping level to reduce a PAPR of the signaling. In some examples, the control signaling may include an indication of the clipping level for the signaling. In some examples, the control signaling may include a PSIM identifying amplitudes and locations of clipped peaks in the data, which may enable the device 300 to at least partially reconstruct the data in the signaling based on the clipping level.

The device 300 may apply a fast Fourier transform (FFT) to the received signaling at one or more FFT components 310 (e.g., an FFT component 310-a and an FFT component 310-b) to obtain the symbols in the frequency domain. A demapper 315 may select the symbols (e.g., resource elements) containing information intended for the device 300. A PSIM decoder 320 may decode the PSIM in the control signaling and send information from the PSIM to a peak signal generator 325. The peak signal generator 325 may generate peak signals (e.g., signals including the peaks identified in the PSIM) based on the decoded control signaling. The generated peak signals may be sent to an FFT component 310-c to obtain symbols in the frequency domain corresponding to the peak signals. The obtained symbols may be sent to one or more summers 340 (e.g., a summer 340-a and a summer 340-b) to be combined with the symbols corresponding to the data in the received signaling.

The demapper 315 may send the symbols corresponding to the received signaling (e.g., the symbols including control signaling, data, reference signals, PMI, etc.) to an equalizer 330. The equalizer 330 may equalize the data symbols to compensate for the transmission environment of the received signaling (e.g., interference, noise, channel fading, etc.). The data symbols may be multiplied by an inverse of a precoding matrix indicated by the PMI at a multiplier 335 before the data symbols are combined with the symbols corresponding to the peak signals at the summers 340. The combined symbols output by the summers 340 may represent a reconstructed data signal including the peaks clipped according the clipping level.

A decoder 345 may process the combined symbols, which may include multiplying the combined symbols by the precoding matrix indicated in the PMI, demodulating the combined symbols, and decoding the data. The decoder 345 may then pass the decoded data to higher layer protocols (e.g., MAC, RLC, PDCP, etc.) for further processing.

In some examples, the equalizer 330 may equalize the data symbols according to a channel estimation based on pilot symbols corresponding to reference signals in the received signaling. It may be beneficial to clip the pilot symbols according to the clipping level indicated in the received signaling. Thus, other symbols (e.g., data symbols) multiplexed with the pilot symbols of the reference signals may be decoded based on the reference signals, the peaks of which may be clipped and reconstructed as described herein. If the pilot symbols are not clipped, the PAPR of the pilot symbols may reduce the power efficiency improvements from clipping the data symbols. However, clipping the pilot symbols may result in distortion for the reference signals, which may degrade channel estimation performance at the device 300. The degraded channel estimation may impact the performance of the equalizer 330 when equalizing the data.

According to the techniques described herein, the device 300 may improve channel estimation performance by iteratively reconstructing clipped pilot symbols of reference signals in the received signaling. If, for example, a sequence of pilot symbols of the reference signals is known at the device 300, the device 300 may identify distortions in the received pilot symbols based on the clipping level. The device 300 may then iteratively reconstruct peaks of the clipped pilot symbols until the device 300 is able to obtain accurate pilot symbols for use in channel estimation. In some examples, the device 300 may report, to the transmitting device, a capability of performing iterative reference signal reconstruction and channel estimation, for example, by transmitting a capability indicator. The iterative reconstruction procedure is further described herein with reference to FIG. 4.

The techniques described herein may enable the device 300 to improve efficiency and reliability of communications by improving channel estimation, which may increase the probability of successfully decoding information transmitted in the data symbols.

Figure 4:
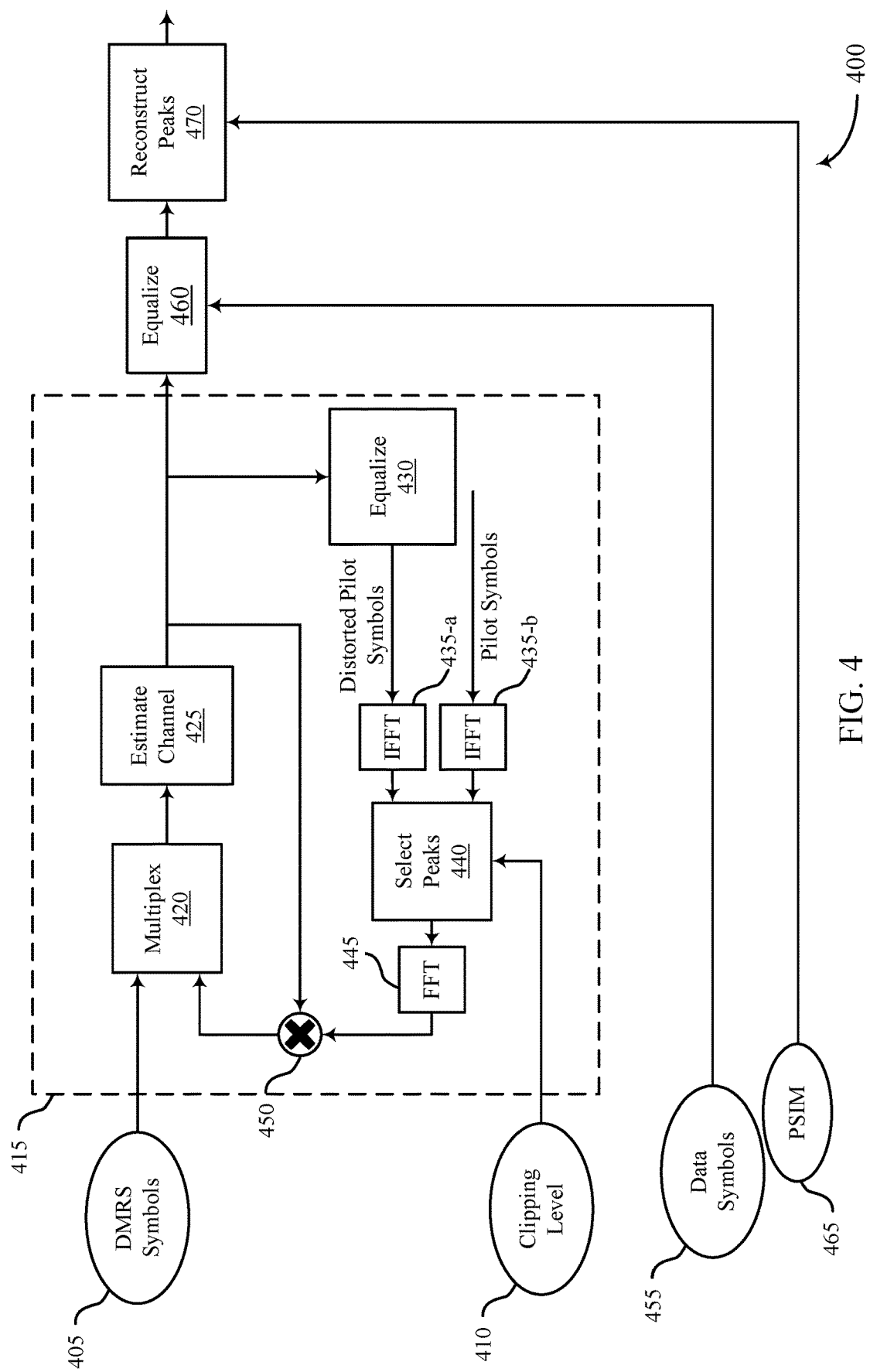
FIG. 4 illustrates an example of a reconstruction scheme that supports iterative reference signal symbol reconstruction and channel estimation in accordance with aspects of the present disclosure.

FIG. 4 illustrates an example of a reconstruction scheme 400 that supports iterative reference signal symbol reconstruction and channel estimation in accordance with aspects of the present disclosure. In some examples, the reconstruction scheme 400 may implement aspects of wireless communication systems 100 and 200. For example, the reconstruction scheme 400 may be implemented at a receiving device 215 described with reference to FIG. 2 and/or a UE 115 or a base station 105 described with reference to FIG. 1. In some examples, the reconstruction scheme 400 may be implemented by an equalizer 330 of a device 300 as described with reference to FIG. 3.

The receiving device may receive signaling from a transmitting device. The signaling may include a waveform in a time domain which represents one or more symbols in a frequency domain, where the symbols may correspond to control signaling (e.g., transmitted via a PDCCH) and a reference signal. For example, the symbols may include a sequence of DMRS symbols 405, which may be referred to as pilot symbols. The signaling may be clipped according to a clipping level 410 to reduce a PAPR of the signaling. In some examples, the control signaling may include an indication of the clipping level 410. In some examples, the symbols may also include data symbols 455. In some examples, the control signaling may include a PSIM 465 identifying amplitudes and locations of clipped peaks in the data symbols 455, which may enable the receiving device to at least partially reconstruct the data in the data symbols 455 based on the clipping level 410.

The data symbols 455 may be equalized at a step 460 to compensate for the transmission environment of the received signaling (e.g., interference, noise, channel fading, etc.). In some examples, the equalizing step 460 may be performed according to a channel estimation based on the reference signal in the received signaling. Thus, reconstructing the peaks of the reference signal may reduce or eliminate (counter) the impact of the clipping on the channel estimate. It may be beneficial to clip the DMRS symbols 405 according to the clipping level 410. If the DMRS symbols 405 are not clipped, the PAPR of the DMRS symbols 405 may reduce the power efficiency improvements from clipping the data symbols 455. However, clipping the DMRS symbols 405 may result in distortion for the reference signals, which may degrade channel estimation performance at the receiving device. As a result, the degraded channel estimation may impact system performance when equalizing the data symbols 455 at the equalizing step 460.

The reconstruction scheme 400 may enable the receiving device to improve channel estimation performance by iteratively reconstructing pilot symbols from the DMRS symbols 405. An iterative approach may be beneficial, for example, because each iteration may improve the accuracy of DMRS reconstruction as well as other determinations made based on the reconstructed DMRS (e.g., channel estimation). For example, an initial iteration may provide an initial reconstruction of peaks clipped from the DMRS, and subsequent iterations may refine and improve the accuracy of the reconstructed peaks. The steps illustrated in the reconstruction scheme 400 may describe a non-limiting example of performing a process that may be described mathematically or programmatically as follows:

$$\hat{Y}^0 = Y$$
$$p^0 = \text{ifft}(P^0)$$
$$\text{for } l = 1 \text{ to } N$$
$$\hat{H}^l = \text{CHEST}(\hat{P}^{l-1}, \hat{Y}^{l-1})$$
$$\hat{P}^l = \hat{H}^{l^H}(\hat{H}^l * \hat{H}^{l^H} + R_{nn})^{-1} \hat{Y}^{l-1}$$
$$\hat{p}^l = \text{ifft}(\hat{P}^l)$$
$$\text{for } n = 1 \text{ to } N_{samples}$$

$$x_n^l = \begin{cases} \hat{p}_n^l, & p_n^o \leq \text{Threshold} \\ p_n^o, & p_n^o > \text{Threshold} \end{cases}$$

$$\text{end}$$
$$\hat{P}^l = \text{fft}(\hat{p}^l)$$
$$\hat{Y}^l = \hat{P}^l \hat{H}^l$$
$$\text{end}$$
$$\hat{H} = \text{CHEST}(\hat{P}^N, \hat{Y}^N)$$

The received DMRS symbols 405 (which may be represented as Y) may be set as an initializing set of channel coefficients (e.g., $\hat{Y}^0$), and an inverse FFT (IFFT) may be applied to a set of known pilot symbols $P^0$ (e.g., pilot symbols of the undistorted reference signal) to generate a time domain representation $p^0$. The reconstruction scheme may include N iterations 415, where a given iteration 415 may be represented by an index l. In a first iteration 415 (i.e., l=1), the DMRS symbols 405 may be selected at a multiplexer at a multiplexing step 420. Additionally, an initial set of distorted pilot symbols $\hat{P}^0$ may be generated based on the DMRS symbols 405.

The output of the multiplexer (e.g., the DMRS symbols 405 for the first iteration 415) may be used for channel estimation at a channel estimating step 425. In some examples, the output of the channel estimation step 425 may be represented by a channel estimation matrix $\hat{H}^l = \text{CHEST}(\hat{P}^{l-1}, \hat{Y}^{l-1})$ where the matrix $\hat{H}^l$ may be generated based on the pilot symbols $\hat{P}^{l-1}$ and the channel $\hat{Y}^{l-1}$ of the previous iteration 415. A set of distorted pilot symbols $\hat{P}^l$ may be generated at an equalizing step 430. In some examples, the distorted pilot symbols $\hat{P}^l$ may be based on the matrix $\hat{H}^l$ according to $\hat{P}^l = \hat{H}^{l^H}(\hat{H}^{l^*}\hat{H}^{l^H}+R_{nn})^{-1} \hat{Y}^{l-1}$, where $\hat{H}^{l^H}$ represents the complex conjugate of the matrix $\hat{H}^l$, and $R_{nn}$ represents a noise covariance associated with the channel.

In some examples, the distorted pilot symbols $\hat{P}^l$ may be converted to a time domain representation $\hat{p}^l$ via an IFFT step 435-a. Similarly, the set of known pilot symbols $P^0$ may be converted to the time domain representation $p^0$ via an IFFT step 435-b. The time domain representations $\hat{p}^l$ and $p^0$ may be sampled at a peak selection step 440, where a given sample x may be indexed by the index l of the current iteration 415 and the index n of the given sample. For each sample $x_n^l$, the corresponding time domain representation $p_n^o$ of the known pilot symbols $P^0$ may be compared to a threshold, where the threshold may be based on the clipping level 410. If the time domain representation $p_n^o$ is greater than the threshold, the associated time domain representation $\hat{p}_n^l$ of the distorted pilot symbols $\hat{P}^l$ may be replaced by the time domain representation $p_n^o$. If the time domain representation $p_n^o$ is less than or equal to the threshold, the associated time domain representation $\hat{p}_n^l$ of the distorted pilot symbols $\hat{P}^l$ may be left unchanged.

The process at the peak selection step 440 described herein may be a non-limiting example of a technique for reconstructing the peaks of the reference signal. In some examples, other techniques may be implemented for comparing the distorted pilot symbols $\hat{P}^l$ to the known pilot symbols P to reconstruct the clipped peaks of the DMRS symbols 405.

The output of the peak selection step 440 may be converted to a frequency domain representation $\hat{P}^l=\text{fft}(\hat{p}^l)$ via an FFT step 445. The frequency domain representation $\hat{P}^l$ may represent an update to the set of distorted pilot symbols $\hat{P}^l$ generated at the equalizing step 430. The channel may be restored by multiplying the updated set of distorted pilot symbols $\hat{P}^l$ by the matrix $\hat{H}^l$ at a multiplication step 450. The resulting channel $\hat{Y}^l=\hat{P}^l \hat{H}^l$ may then be selected by the multiplexer at the multiplexing step 420 of the next iteration 415 (i.e., an iteration 415 with index l+1).

After a configured number of iterations 415 (e.g., N iterations), the final channel estimation $\hat{H}=\text{CHEST}(\hat{P}^N, \hat{Y}^N)$ may be used at the equalizing step 460 for equalizing the data symbols 455. After the equalizing step 460, the PSIM 465 may be used at a peak reconstruction step 470 to reconstruct a data signal including the peaks clipped according to the clipping level 410. The reconstructed data signal may then be decoded and passed to higher layer protocols (e.g., MAC, RLC, PDCP, etc.) for further processing.

The reconstruction scheme 400 described herein may enable the receiving device to improve efficiency and reliability of communications by improving channel estimation, which may increase the probability of successfully decoding information transmitted in the data symbols 455.

Figure 5:
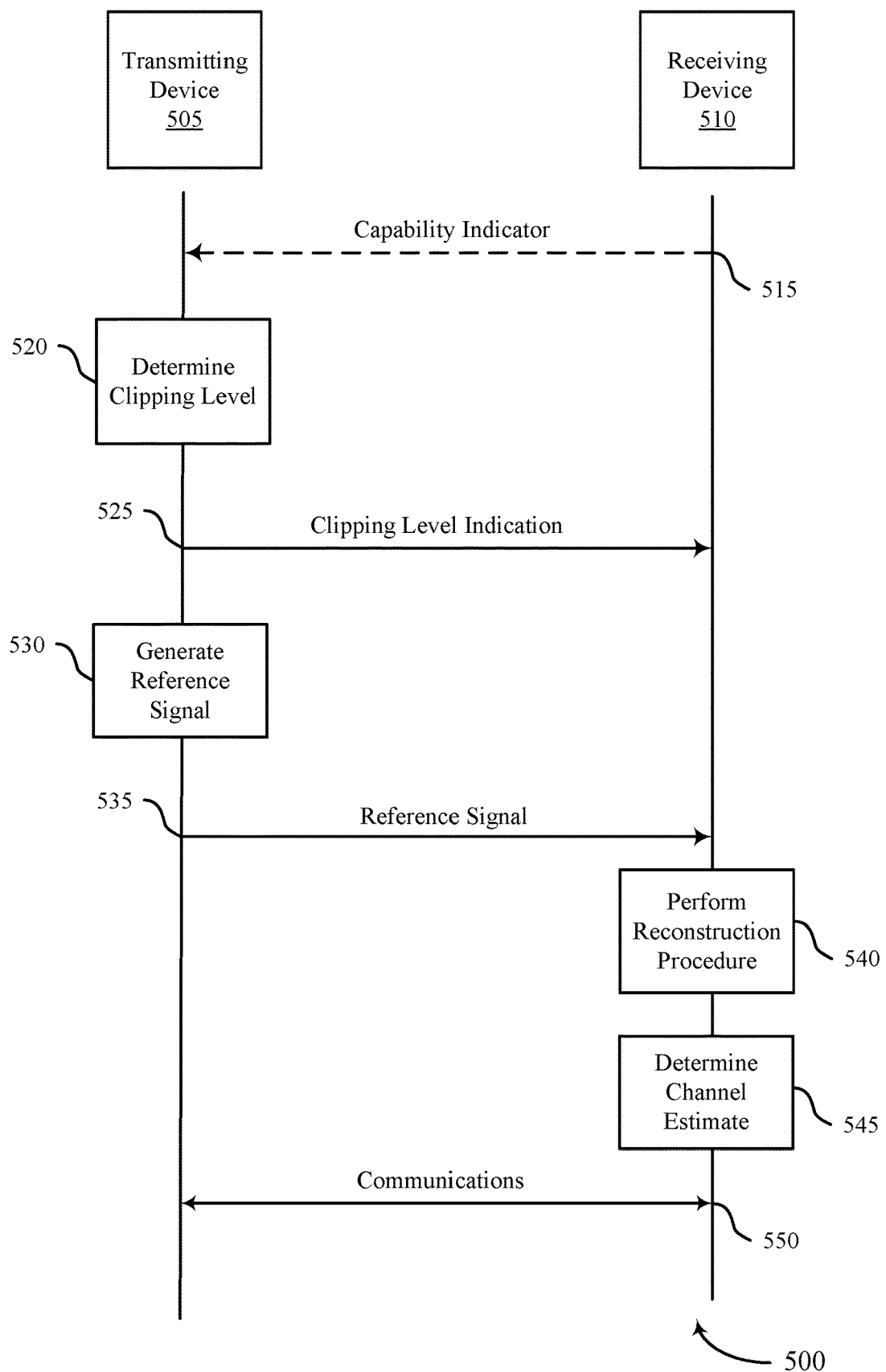
FIG. 5 illustrates an example of a process flow that supports iterative reference signal symbol reconstruction and channel estimation in accordance with aspects of the present disclosure.

FIG. 5 illustrates an example of a process flow 500 that supports iterative reference signal symbol reconstruction and channel estimation in accordance with aspects of the present disclosure. In some examples, the process flow 500 may implement aspects of wireless communications systems 100 and 200. For example, the process flow 500 may include example operations associated with one or more of a transmitting device 505 or a receiving device 510, which may be examples of corresponding devices described with reference to FIGS. 1 and 2. In the following description of the process flow 500, the operations between the transmitting device 505 and the receiving device 510 may be performed in a different order than the example order shown, or the operations performed by the transmitting device 505 and the receiving device 510 may be performed in different orders or at different times. Some operations may also be omitted from the process flow 500, and other operations may be added to the process flow 500. The operations performed by the transmitting device 505 and the receiving device 510 may support improvements to device transmission operations and, in some examples, may promote improvements to the device communications reliability, among other benefits.

In some examples, at 515 the receiving device 510 may transmit a capability indicator to the transmitting device 505. The capability indicator may indicate, to the transmitting device 505, that the receiving device 510 has iterative channel estimation and reconstruction capability. In some examples, the capability indicator may be a bit in control signaling (e.g., transmitted via a PUCCH) from the receiving device 510.

At 520, the transmitting device 505 may identify a clipping level at which to clip a reference signal for the receiving device 510. The transmitting device 505 may apply the clipping level to reduce a PAPR of the reference signal. In some examples, the transmitting device 505 may determine the clipping level based on a desired PAPR of the reference signal. In some examples, the transmitting device 505 may determine the clipping level based on the capability indicator from the receiving device 510.

At 525, the transmitting device 505 may transmit an indication of the clipping level to the receiving device 510. In some examples, the clipping level indication may be sent via a control channel (e.g., a PDCCH or a dedicated control channel) or in a control message multiplexed on a data channel (e.g., a PDSCH).

At 530, the transmitting device 505 may generate the reference signal. To reduce the PAPR of the reference signal, the transmitting device 505 may clip or chop off peaks of the reference signal above the clipping level and may fill predetermined values in place of the clipped peaks.

At 535, the transmitting device 505 may transmit the clipped reference signal to the receiving device 510. In some examples, the clipped reference signal may be a DMRS representing one or more pilot symbols.

At 540, the receiving device 510 may perform a reference signal reconstruction procedure to obtain accurate pilot symbols for use in channel estimation. If, for example, a sequence of pilot symbols of the reference signal is known at the receiving device 510, the receiving device 510 may identify distortions in the received pilot symbols based on the clipping level. In some examples, the receiving device 510 may iteratively reconstruct peaks of the clipped reference signal until the receiving device 510 is able to obtain accurate pilot symbols for use in estimating a channel.

At 545, the receiving device 510 may determine a channel estimate for the channel using the pilot symbols obtained through the reconstruction procedure. The channel estimate may enable the receiving device 510 to compensate for the transmission environment of received signaling (e.g., interference, noise, channel fading, etc.).

At 550, the transmitting device 505 and the receiving device 510 may communicate on the channel. In some examples, the receiving device 510 may receive a signal that is clipped based on the clipping level. The signal may include control signaling sent via a control channel, signaling sent via a data channel, or both. The receiving device 510 may generate a reconstructed signal based on the received clipped signal and the determined channel estimate and then decode the reconstructed signal.

The operations performed by the transmitting device 505 and the receiving device 510 described herein may support improvements to device transmission operations and, in some examples, may promote improvements to the decoding reliability at the receiving device 510, among other benefits.

Figure 6:
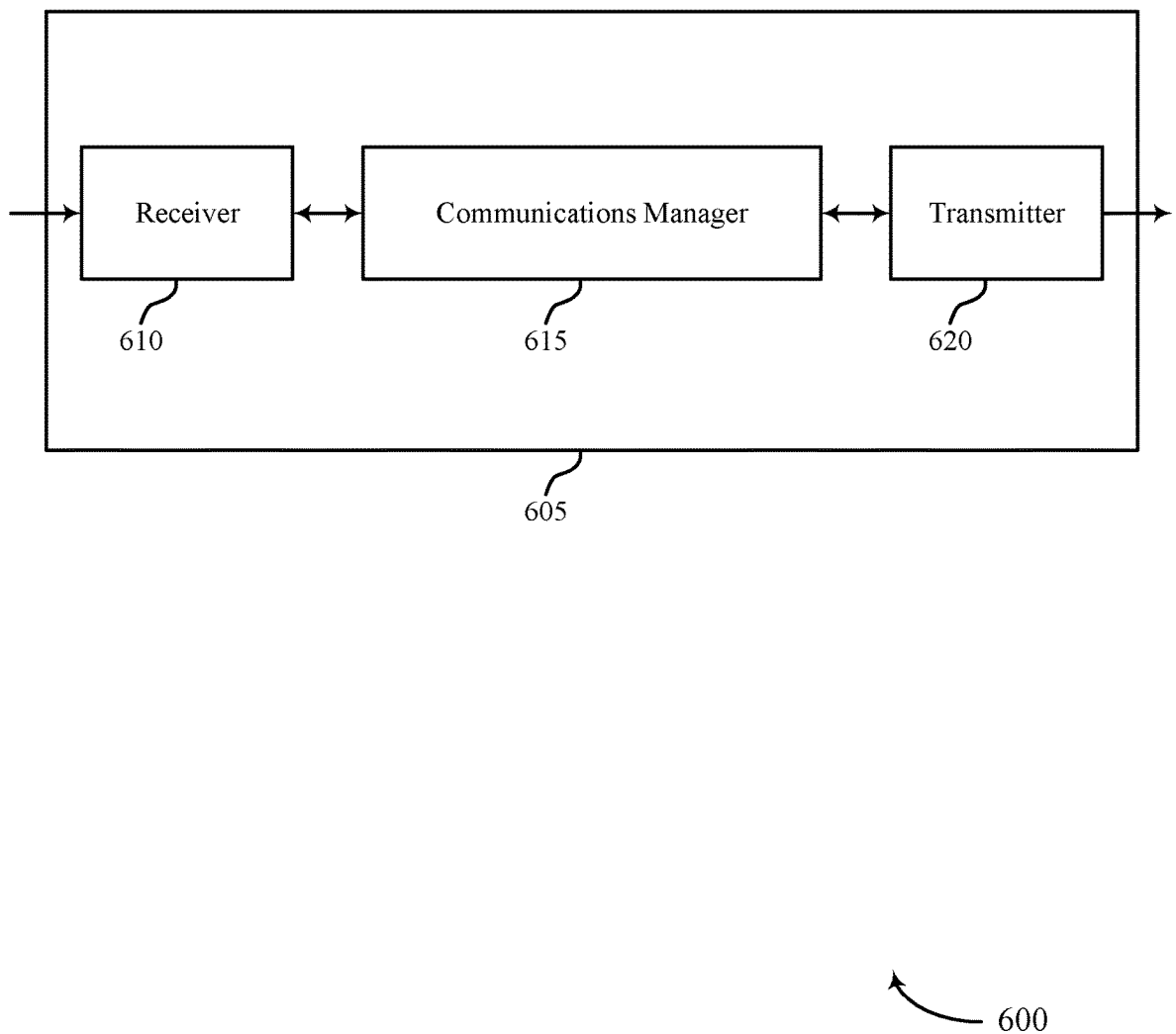
FIGS. 6 and 7 show block diagrams of devices that support iterative reference signal symbol reconstruction and channel estimation in accordance with aspects of the present disclosure.

FIG. 6 shows a block diagram 600 of a device 605 that supports iterative reference signal symbol reconstruction and channel estimation in accordance with aspects of the present disclosure. The device 605 may be an example of aspects of receiving device such as a UE 115 or a base station 105 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to iterative reference signal symbol reconstruction and channel estimation, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a transmitting device, an indication of a clipping level associated with a reference signal, receive the reference signal from the transmitting device, where the reference signal is distorted based on the clipping level, perform a reconstruction procedure for the reference signal based on the indication of the clipping level, where the reconstruction procedure includes one or more iterations, determine a channel estimate associated with the reference signal based on the reconstruction procedure, and communicate with the transmitting device based on the channel estimate.

The communications manager 615 as described herein may be implemented to realize one or more potential advantages. One implementation may allow the device 605 to save power by communicating with a transmitting device (e.g., a base station 105 or a UE 115 as shown in FIG. 1) more efficiently. For example, the device 605 may efficiently receive data from the transmitting device based on reconstructing the distorted reference signal. As a result, the device 605 may be able to increase the probability of successfully decoding information from the transmitting device, which may reduce or eliminate unnecessary or failed communications from the transmitting device. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver. For example, the transmitter 620 may be an example of aspects of the transceiver 920 described with reference to FIG. 9. The transmitter 620 may utilize a single antenna or a set of antennas.

Figure 7:
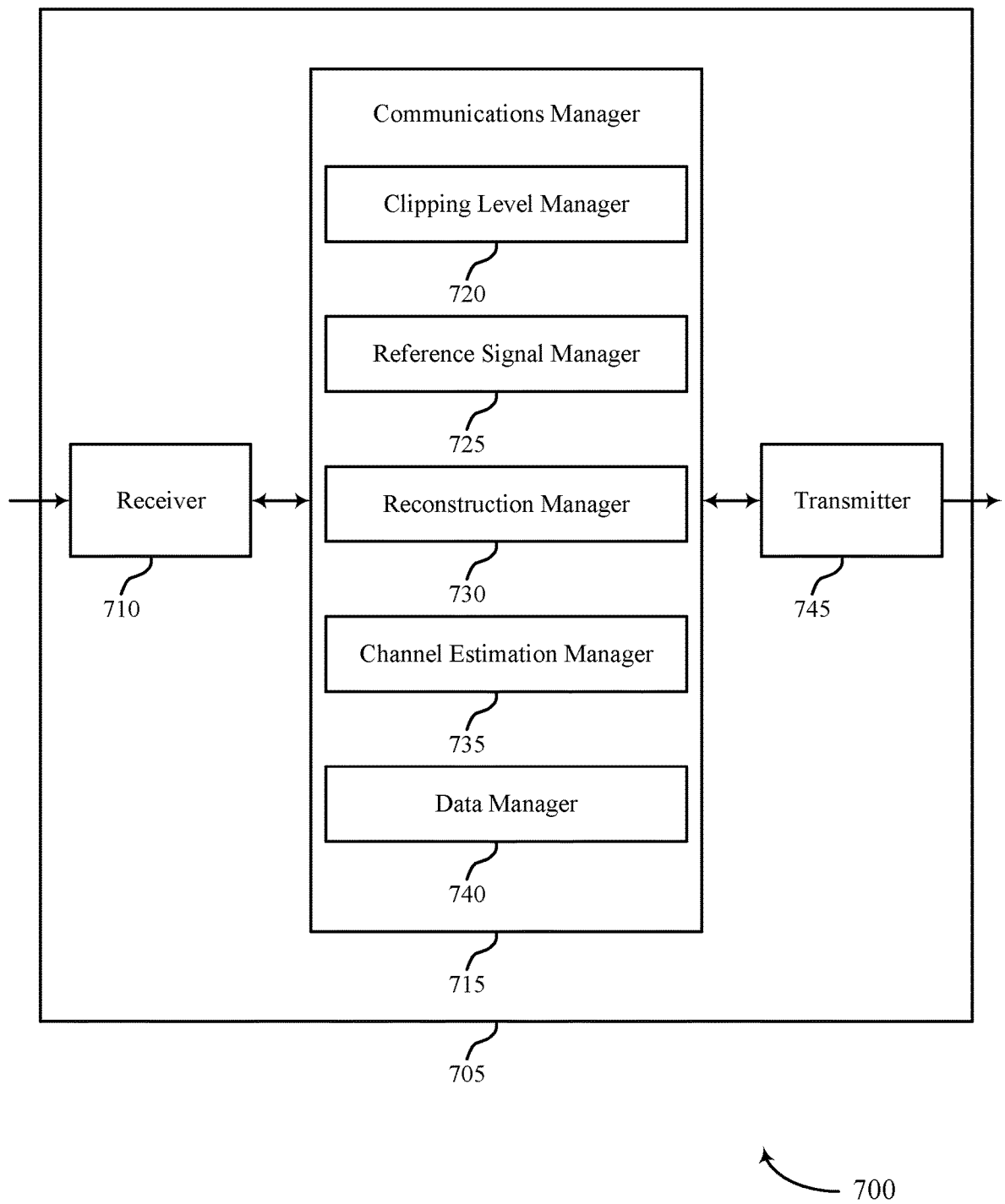

FIG. 7 shows a block diagram 700 of a device 705 that supports iterative reference signal symbol reconstruction and channel estimation in accordance with aspects of the present disclosure. The device 705 may be an example of aspects of a device 605, or a receiving device such as a UE 115 or a base station 105 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to iterative reference signal symbol reconstruction and channel estimation, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a clipping level manager 720, a reference signal manager 725, a reconstruction manager 730, a channel estimation manager 735, and a data manager 740. The communications manager 715 may be an example of aspects of the communications manager 910 described herein.

The clipping level manager 720 may receive, from a transmitting device, an indication of a clipping level associated with a reference signal.

The reference signal manager 725 may receive the reference signal from the transmitting device, where the reference signal is distorted based on the clipping level.

The reconstruction manager 730 may perform a reconstruction procedure for the reference signal based on the indication of the clipping level, where the reconstruction procedure includes one or more iterations.

The channel estimation manager 735 may determine a channel estimate associated with the reference signal based on the reconstruction procedure.

The data manager 740 may communicate with the transmitting device based on the channel estimate.

The transmitter 745 may transmit signals generated by other components of the device 705. In some examples, the transmitter 745 may be collocated with a receiver 710 in a transceiver. For example, the transmitter 745 may be an example of aspects of the transceiver 920 described with reference to FIG. 9. The transmitter 745 may utilize a single antenna or a set of antennas.

Figure 8:
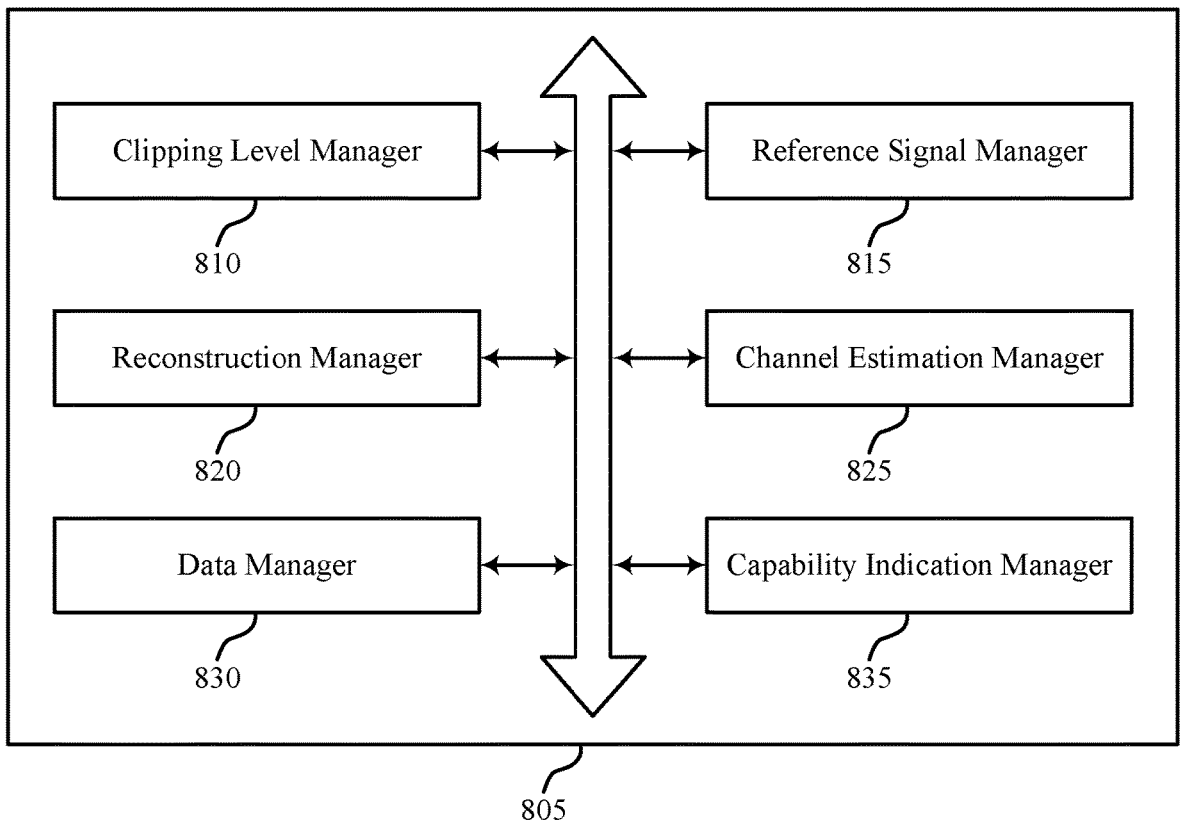
FIG. 8 shows a block diagram of a communications manager that supports iterative reference signal symbol reconstruction and channel estimation in accordance with aspects of the present disclosure.

FIG. 8 shows a block diagram 800 of a communications manager 805 that supports iterative reference signal symbol reconstruction and channel estimation in accordance with aspects of the present disclosure. The communications manager 805 may be an example of aspects of a communications manager 615, a communications manager 715, or a communications manager 910 described herein. The communications manager 805 may include a clipping level manager 810, a reference signal manager 815, a reconstruction manager 820, a channel estimation manager 825, a data manager 830, and a capability indication manager 835. Each of these components may communicate, directly or indirectly, with one another (e.g., via one or more buses).

The clipping level manager 810 may receive, from a transmitting device, an indication of a clipping level associated with a reference signal. In some cases, the clipping level corresponds to an amplitude beyond which the reference signal is clipped. In some cases, the indication of the clipping level is received via a control channel, a data channel, or both.

The reference signal manager 815 may receive the reference signal from the transmitting device, where the reference signal is distorted based on the clipping level. In some cases, the reference signal includes a demodulation reference signal.

The reconstruction manager 820 may perform a reconstruction procedure for the reference signal based on the indication of the clipping level, where the reconstruction procedure includes one or more iterations.

In some examples, the reconstruction manager 820 may determine a first set of symbols for the reference signal based on the received reference signal or a prior iteration of the reconstruction procedure. In some examples, the reconstruction manager 820 may determine a first set of channel coefficients based on the first set of symbols. In some examples, the reconstruction manager 820 may equalize the first set of channel coefficients to obtain an equalized set of channel coefficients. In some examples, the reconstruction manager 820 may determine a set of candidate samples for the reference signal based on the first set of symbols and the equalized set of channel coefficients. In some examples, the reconstruction manager 820 may reconstruct one or more peaks of the reference signal based on the set of candidate samples and the clipping level. In some examples, the reconstruction manager 820 may determine a set of reconstructed samples for the reference signal based on reconstructing the one or more peaks.

In some examples, the reconstruction manager 820 may determine a second set of symbols for the reference signal based on the set of reconstructed samples and the first set of channel coefficients. In some examples, the reconstruction manager 820 may identify one or more candidate samples of the set of candidate samples as below the clipping level. In some examples, the reconstruction manager 820 may identify, for the one or more candidate samples identified as below the clipping level, respective known samples associated with the reference signal. In some examples, the reconstruction manager 820 may determine that one or more of the respective known samples are above the clipping level. In some examples, the reconstruction manager 820 may substitute the one or more respective known samples that are above the clipping level for corresponding candidate samples.

The channel estimation manager 825 may determine a channel estimate associated with the reference signal based on the reconstruction procedure. In some examples, the channel estimation manager 825 may obtain a reconstructed set of symbols for the reference signal based on an iteration of the reconstruction procedure. In some examples, the channel estimation manager 825 may determine a set of channel coefficients based on the reconstructed set of symbols.

The data manager 830 may communicate with the transmitting device based on the channel estimate. In some examples, the data manager 830 may receive, from the transmitting device, a second signal that is distorted based on the clipping level. In some examples, the data manager 830 may generate a reconstructed signal based on the second signal and the channel estimate. In some examples, the data manager 830 may decode the reconstructed signal. In some examples, the data manager 830 may equalize the second signal based on the channel estimate.

In some examples, the data manager 830 may receive, from the transmitting device, information associated with peaks clipped from the second signal. In some examples, the data manager 830 may reconstruct one or more peaks of the second signal based on the information. In some cases, the second signal is received via a data channel.

The capability indication manager 835 may transmit a capability indicator that indicates a capability of the receiving device to perform the reconstruction procedure for the reference signal, where receiving the indication of the clipping level is based on transmitting the capability indicator.

Figure 9:
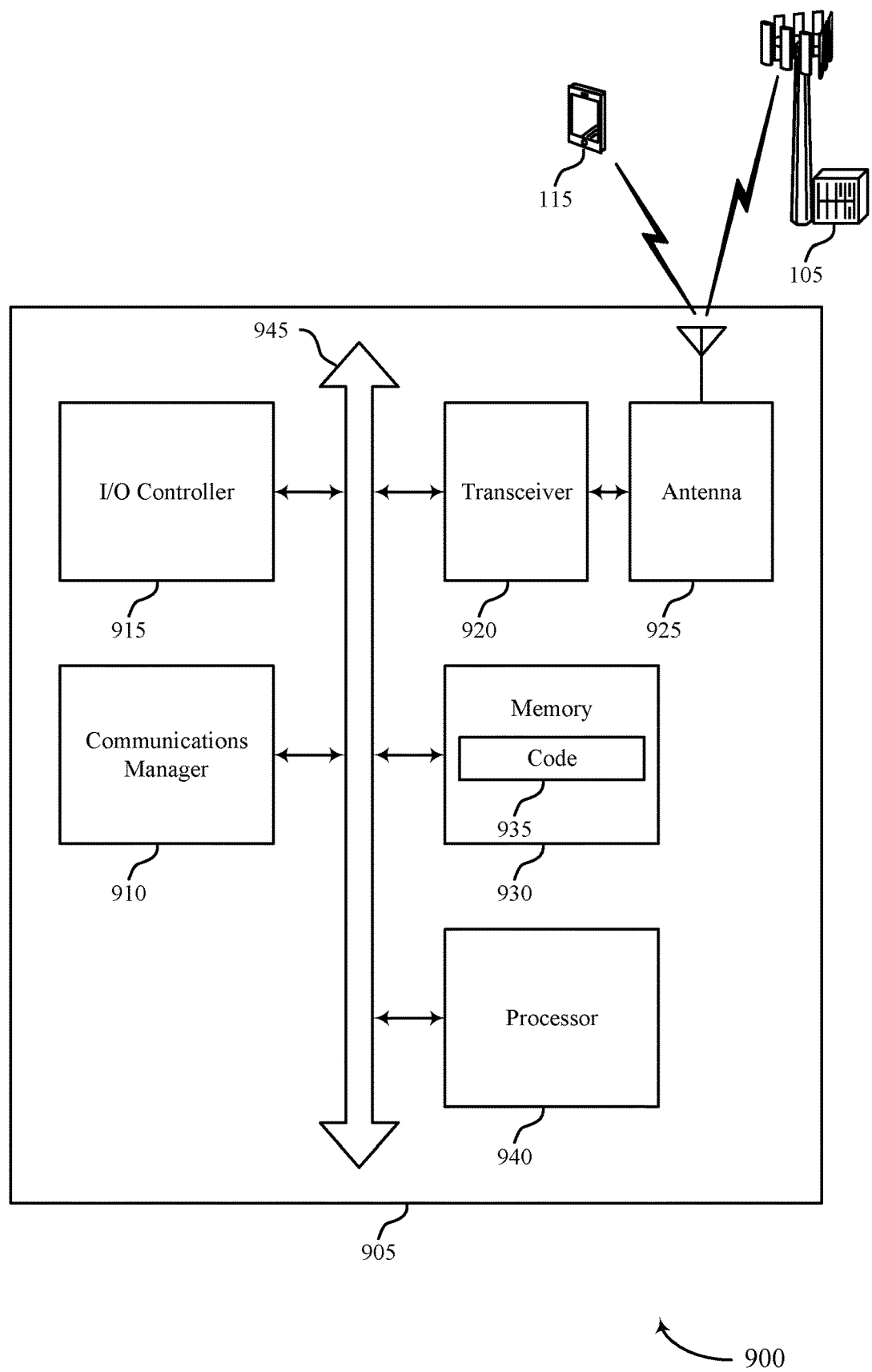
FIG. 9 shows a diagram of a system including a device that supports iterative reference signal symbol reconstruction and channel estimation in accordance with aspects of the present disclosure.

FIG. 9 shows a diagram of a system 900 including a device 905 that supports iterative reference signal symbol reconstruction and channel estimation in accordance with aspects of the present disclosure. The device 905 may be an example of or include the components of device 605, device 705, or receiving device such as a UE 115 or a base station 105 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a transmitting device, an indication of a clipping level associated with a reference signal, receive the reference signal from the transmitting device, where the reference signal is distorted based on the clipping level, perform a reconstruction procedure for the reference signal based on the indication of the clipping level, where the reconstruction procedure includes one or more iterations, determine a channel estimate associated with the reference signal based on the reconstruction procedure, and communicate with the transmitting device based on the channel estimate.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting iterative reference signal symbol reconstruction and channel estimation).

The processor 940 of the device 905 (e.g., controlling the receiver 610, the transmitter 620, or the transceiver 920) may reduce power consumption and increase communication efficiency based on iteratively reconstructing the reference signal from the transmitting device. In some examples, the processor 940 of the device 905 may reconfigure parameters associated with channel estimation. For example, the processor 940 of the device 905 may turn on one or more processing units for processing the reference signal, increase a processing clock, or a similar mechanism within the device 905. As such, when subsequent clipped reference signals are received, the processor 940 may be ready to respond more efficiently through the reduction of a ramp up in processing power. The improvements in power saving and communication efficiency may further increase battery life at the device 905 (for example, by reducing or eliminating unnecessary or failed communications, etc.).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
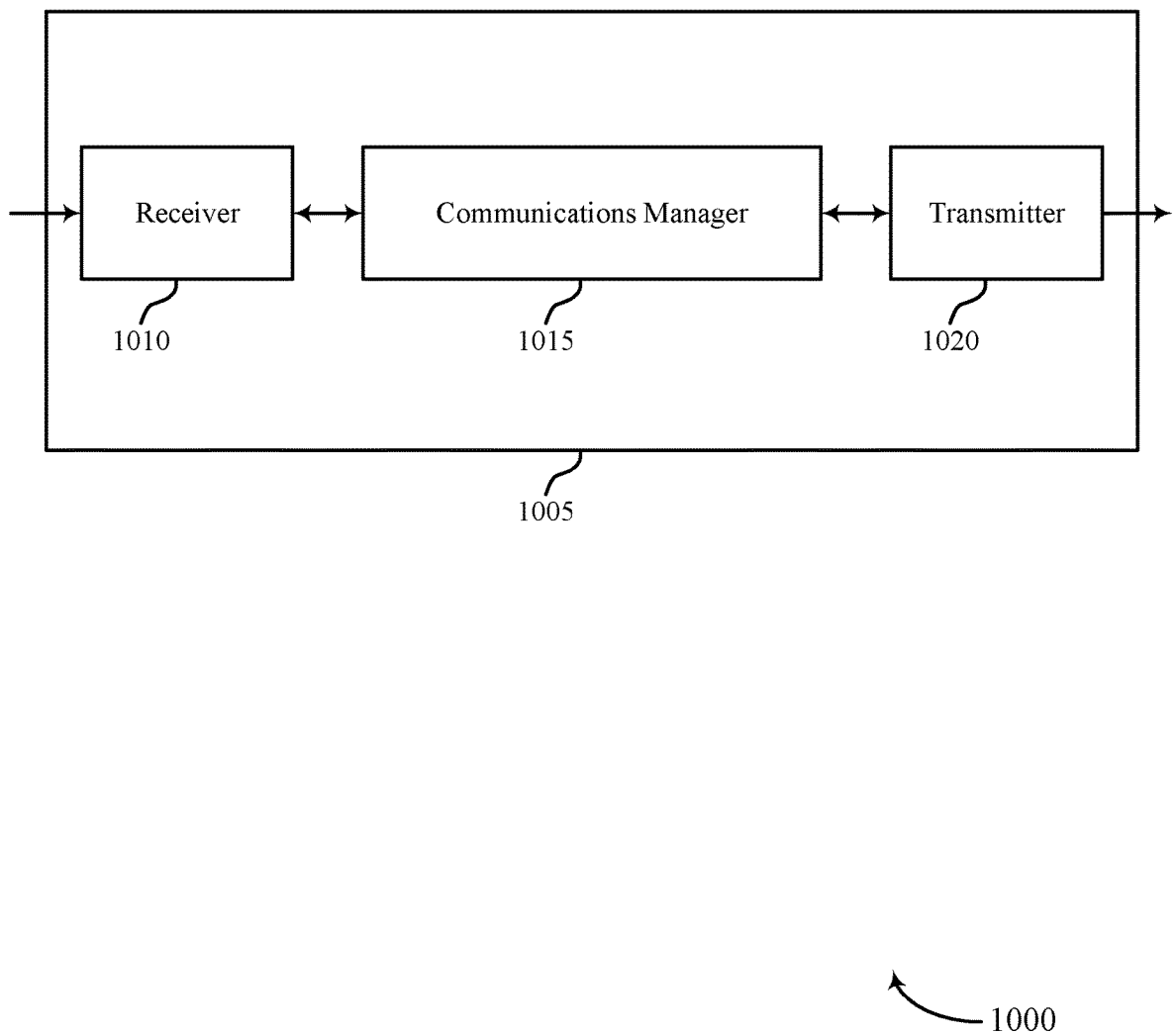
FIGS. 10 and 11 show block diagrams of devices that support iterative reference signal symbol reconstruction and channel estimation in accordance with aspects of the present disclosure.

FIG. 10 shows a block diagram 1000 of a device 1005 that supports iterative reference signal symbol reconstruction and channel estimation in accordance with aspects of the present disclosure. The device 1005 may be an example of aspects of a transmitting device such as a base station 105 or a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to iterative reference signal symbol reconstruction and channel estimation, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a clipping level associated with a reference signal for transmission to a receiving device, transmit an indication of the clipping level to the receiving device, generate the reference signal, where the reference signal is distorted based on the clipping level, and transmit the reference signal to the receiving device.

The communications manager 1015 as described herein may be implemented to realize one or more potential advantages. One implementation may allow the device 1005 to save power by communicating with a receiving device (e.g., a base station 105 or a UE 115 as shown in FIG. 1) more efficiently. For example, the device 1005 may efficiently transmit data by reducing a PAPR of transmissions while also increasing the probability of the receiving device successfully decoding information from the transmitting device based on the indicated clipping level, which may reduce or eliminate unnecessary or failed communications from the transmitting device. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver. For example, the transmitter 1020 may be an example of aspects of the transceiver 1320 described with reference to FIG. 13. The transmitter 1020 may utilize a single antenna or a set of antennas.

Figure 11:
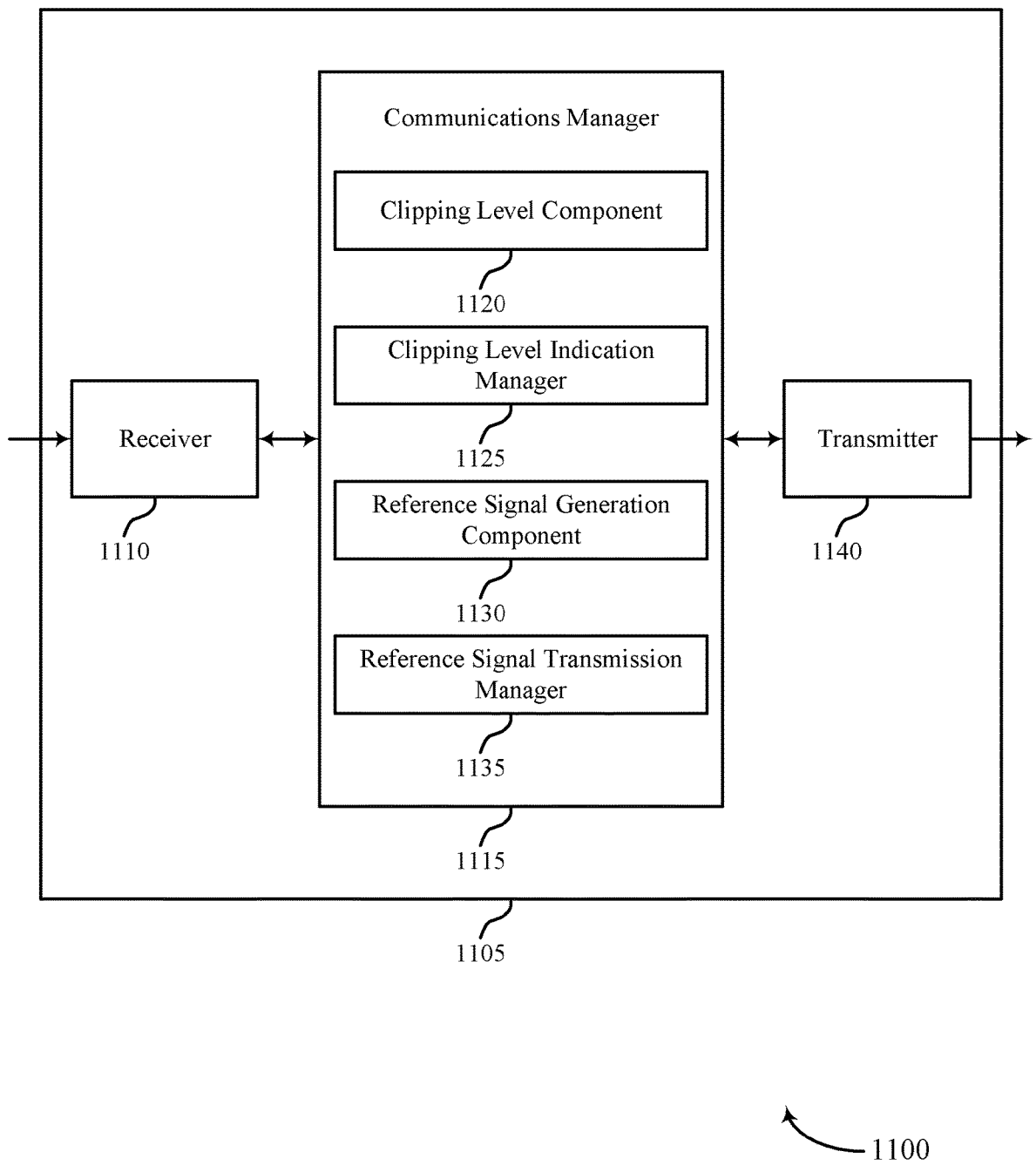

FIG. 11 shows a block diagram 1100 of a device 1105 that supports iterative reference signal symbol reconstruction and channel estimation in accordance with aspects of the present disclosure. The device 1105 may be an example of aspects of a device 1005, or a transmitting device such as a base station 105 or a UE 115 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to iterative reference signal symbol reconstruction and channel estimation, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a clipping level component 1120, a clipping level indication manager 1125, a reference signal generation component 1130, and a reference signal transmission manager 1135. The communications manager 1115 may be an example of aspects of the communications manager 1310 described herein.

The clipping level component 1120 may identify a clipping level associated with a reference signal for transmission to a receiving device.

The clipping level indication manager 1125 may transmit an indication of the clipping level to the receiving device.

The reference signal generation component 1130 may generate the reference signal, where the reference signal is distorted based on the clipping level.

The reference signal transmission manager 1135 may transmit the reference signal to the receiving device.

The transmitter 1140 may transmit signals generated by other components of the device 1105. In some examples, the transmitter 1140 may be collocated with a receiver 1110 in a transceiver. For example, the transmitter 1140 may be an example of aspects of the transceiver 1320 described with reference to FIG. 13. The transmitter 1140 may utilize a single antenna or a set of antennas.

Figure 12:
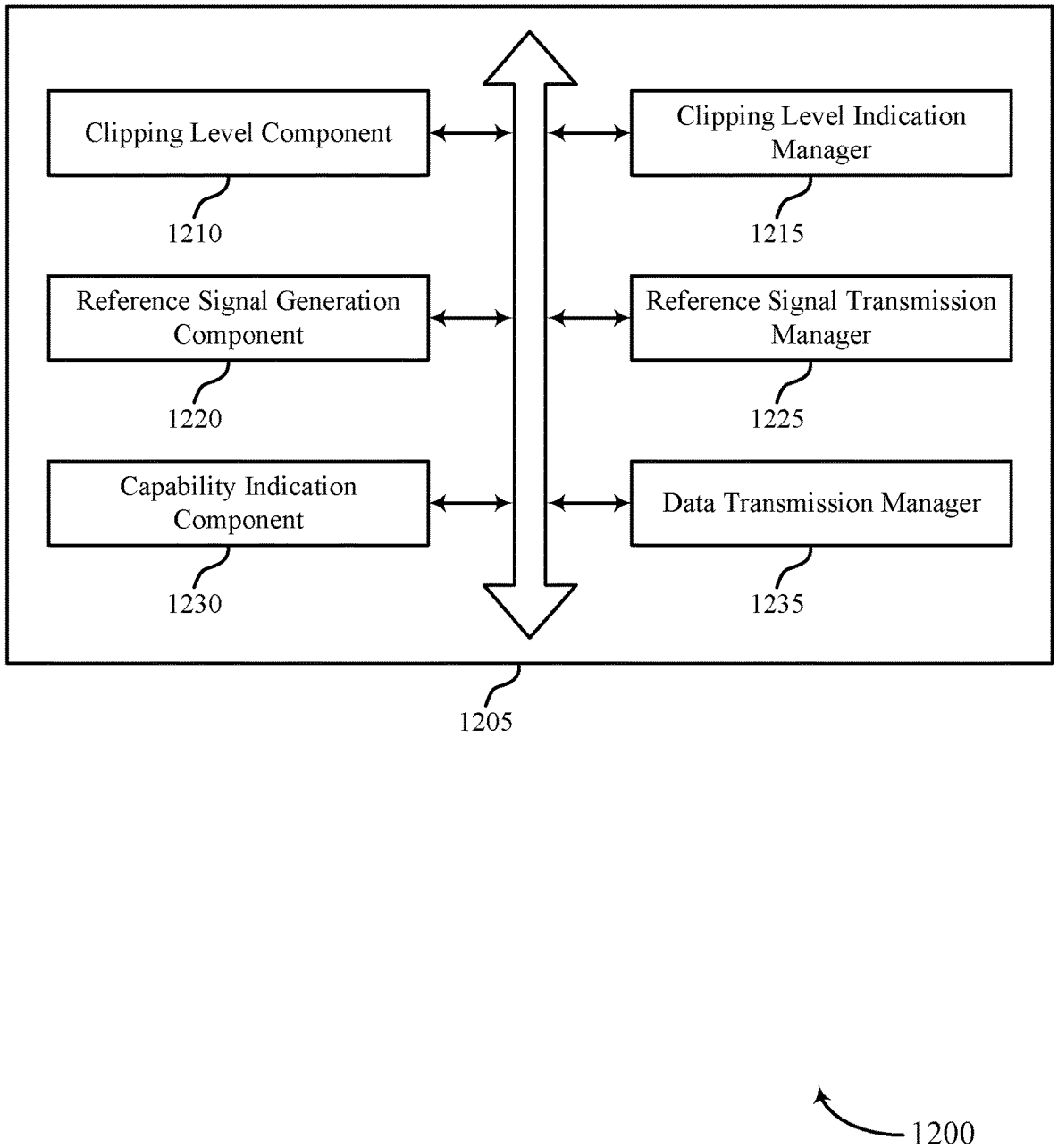
FIG. 12 shows a block diagram of a communications manager that supports iterative reference signal symbol reconstruction and channel estimation in accordance with aspects of the present disclosure.

FIG. 12 shows a block diagram 1200 of a communications manager 1205 that supports iterative reference signal symbol reconstruction and channel estimation in accordance with aspects of the present disclosure. The communications manager 1205 may be an example of aspects of a communications manager 1015, a communications manager 1115, or a communications manager 1310 described herein. The communications manager 1205 may include a clipping level component 1210, a clipping level indication manager 1215, a reference signal generation component 1220, a reference signal transmission manager 1225, a capability indication component 1230, and a data transmission manager 1235. Each of these components may communicate, directly or indirectly, with one another (e.g., via one or more buses).

The clipping level component 1210 may identify a clipping level associated with a reference signal for transmission to a receiving device.

The clipping level indication manager 1215 may transmit an indication of the clipping level to the receiving device. In some examples, the clipping level indication manager 1215 may transmit control signaling indicating the clipping level. In some cases, the control signaling is transmitted via a control channel, a data channel, or both.

The reference signal generation component 1220 may generate the reference signal, where the reference signal is distorted based on the clipping level. In some examples, the reference signal generation component 1220 may clip one or more samples of the reference signal, where all samples of the reference signal have an amplitude at or below the clipping level based on the clipping. In some cases, the reference signal includes a demodulation reference signal.

The reference signal transmission manager 1225 may transmit the reference signal to the receiving device.

The capability indication component 1230 may receive a capability indicator indicating a capability of the receiving device to perform a reconstruction procedure for the reference signal, where transmitting the indication of the clipping level is based on receiving the capability indicator. The data transmission manager 1235 may transmit, to the receiving device, a second signal that is distorted based on the clipping level. In some cases, the reference signal and the second signal are transmitted within a same transmission time interval. In some cases, the second signal is transmitted via a data channel.

Figure 13:
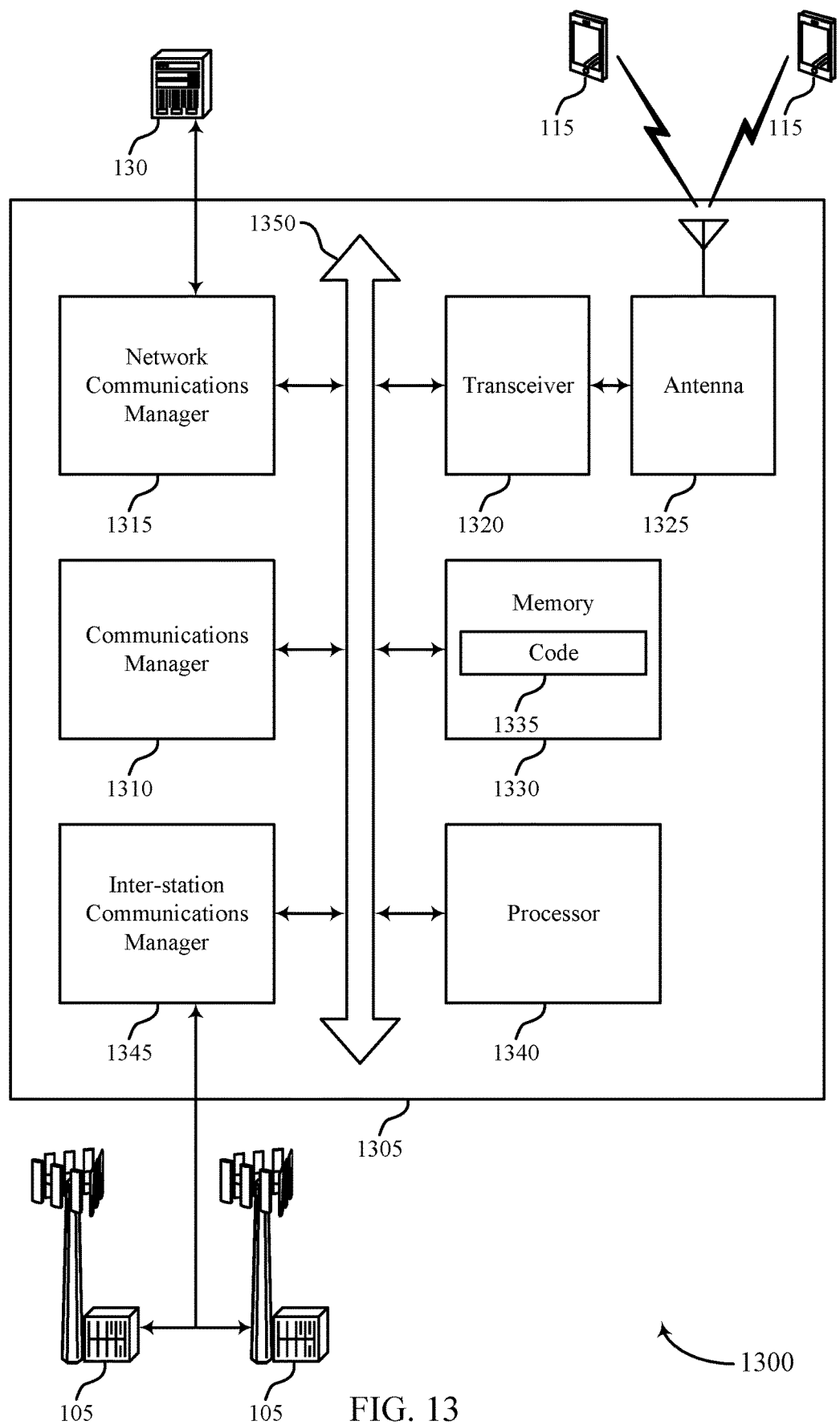
FIG. 13 shows a diagram of a system including a device that supports iterative reference signal symbol reconstruction and channel estimation in accordance with aspects of the present disclosure.

FIG. 13 shows a diagram of a system 1300 including a device 1305 that supports iterative reference signal symbol reconstruction and channel estimation in accordance with aspects of the present disclosure. The device 1305 may be an example of or include the components of device 1005, device 1105, or a transmitting device such as a base station 105 or a UE 115 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a clipping level associated with a reference signal for transmission to a receiving device, transmit an indication of the clipping level to the receiving device, generate the reference signal, where the reference signal is distorted based on the clipping level, and transmit the reference signal to the receiving device.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting iterative reference signal symbol reconstruction and channel estimation).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
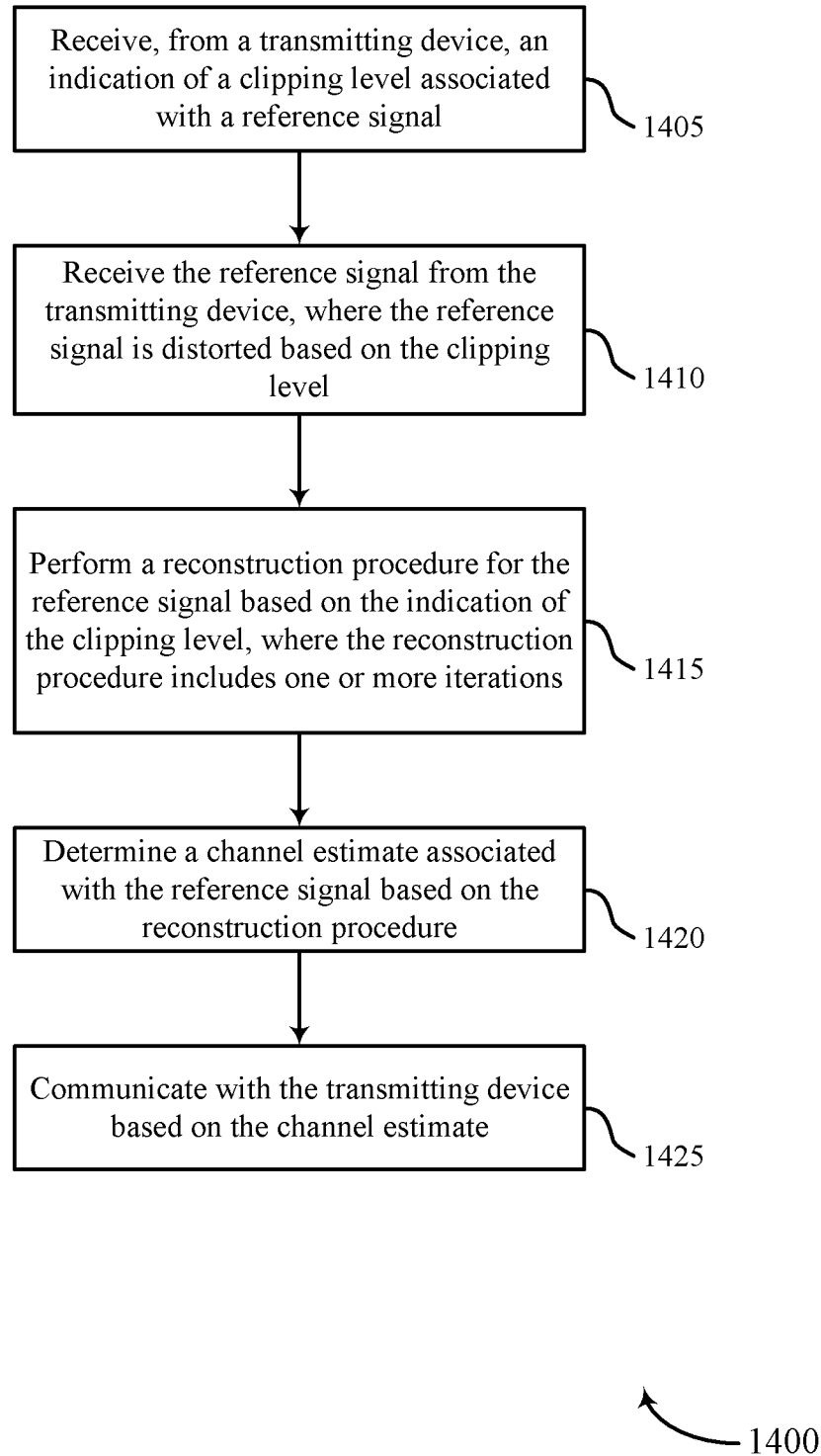
FIGS. 14 through 17 show flowcharts illustrating methods that support iterative reference signal symbol reconstruction and channel estimation in accordance with aspects of the present disclosure.

FIG. 14 shows a flowchart illustrating a method 1400 that supports iterative reference signal symbol reconstruction and channel estimation in accordance with aspects of the present disclosure. The operations of method 1400 may be implemented by a receiving device (e.g., a UE 115 or a base station 105) or its components as described herein. For example, the operations of method 1400 may be performed by a communications manager as described with reference to FIGS. 6 through 9. In some examples, a receiving device may execute a set of instructions to control the functional elements of the receiving device to perform the functions described herein. Additionally or alternatively, a receiving device may perform aspects of the functions described herein using special-purpose hardware.

At 1405, the receiving device may receive, from a transmitting device, an indication of a clipping level associated with a reference signal. The operations of 1405 may be performed according to the methods described herein. In some examples, aspects of the operations of 1405 may be performed by a clipping level manager as described with reference to FIGS. 6 through 9.

At 1410, the receiving device may receive the reference signal from the transmitting device, where the reference signal is distorted based on the clipping level. The operations of 1410 may be performed according to the methods described herein. In some examples, aspects of the operations of 1410 may be performed by a reference signal manager as described with reference to FIGS. 6 through 9.

At 1415, the receiving device may perform a reconstruction procedure for the reference signal based on the indication of the clipping level, where the reconstruction procedure includes one or more iterations. The operations of 1415 may be performed according to the methods described herein. In some examples, aspects of the operations of 1415 may be performed by a reconstruction manager as described with reference to FIGS. 6 through 9.

At 1420, the receiving device may determine a channel estimate associated with the reference signal based on the reconstruction procedure. The operations of 1420 may be performed according to the methods described herein. In some examples, aspects of the operations of 1420 may be performed by a channel estimation manager as described with reference to FIGS. 6 through 9.

At 1425, the receiving device may communicate with the transmitting device based on the channel estimate. The operations of 1425 may be performed according to the methods described herein. In some examples, aspects of the operations of 1425 may be performed by a data manager as described with reference to FIGS. 6 through 9.

Figure 15:
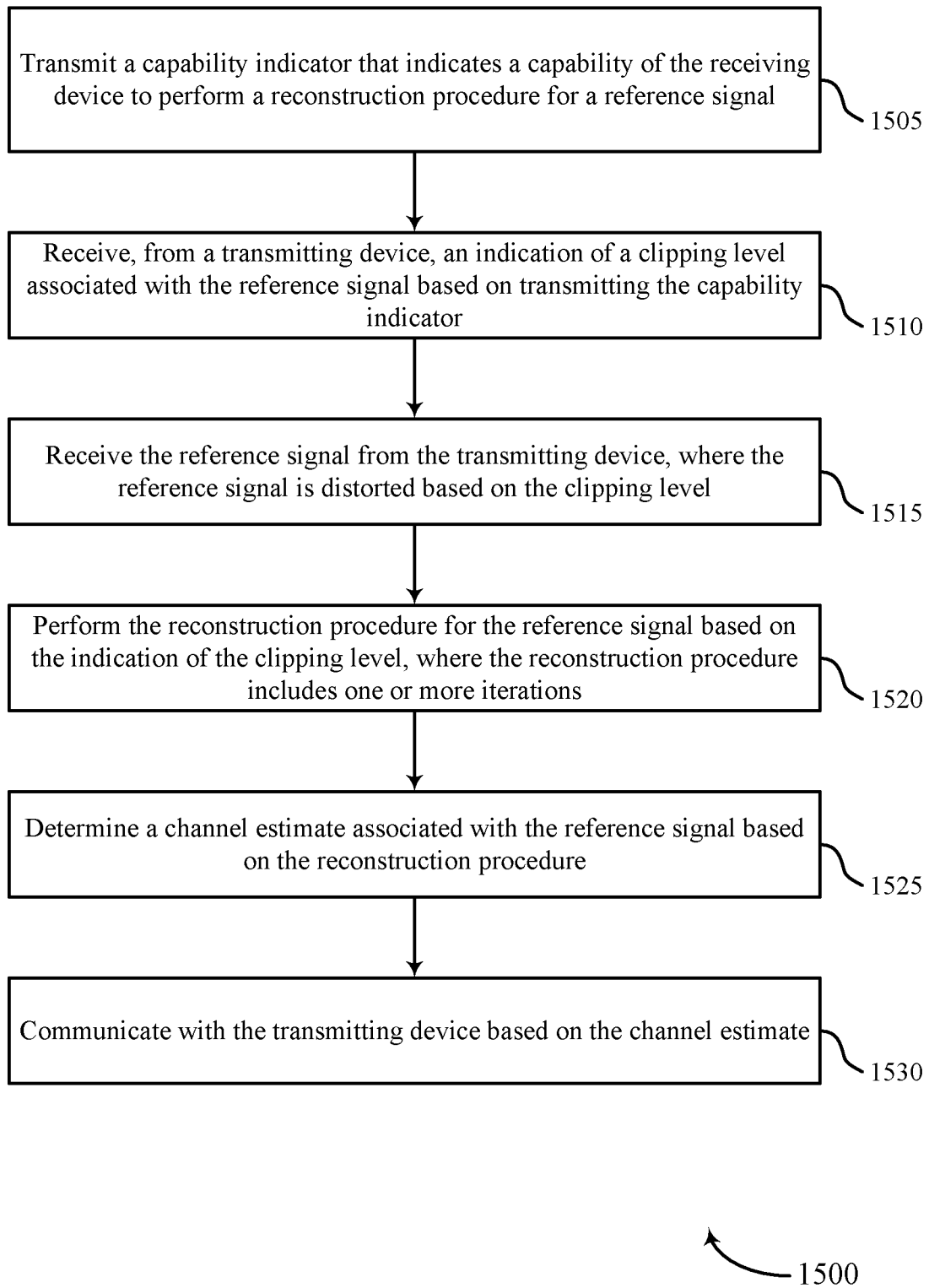

FIG. 15 shows a flowchart illustrating a method 1500 that supports iterative reference signal symbol reconstruction and channel estimation in accordance with aspects of the present disclosure. The operations of method 1500 may be implemented by a receiving device (e.g., a UE 115 or a base station 105) or its components as described herein. For example, the operations of method 1500 may be performed by a communications manager as described with reference to FIGS. 6 through 9. In some examples, a receiving device may execute a set of instructions to control the functional elements of the receiving device to perform the functions described herein. Additionally or alternatively, a receiving device may perform aspects of the functions described herein using special-purpose hardware.

At 1505, the receiving device may transmit a capability indicator that indicates a capability of the receiving device to perform a reconstruction procedure for a reference signal. The operations of 1505 may be performed according to the methods described herein. In some examples, aspects of the operations of 1505 may be performed by a capability indication manager as described with reference to FIGS. 6 through 9.

At 1510, the receiving device may receive, from a transmitting device, an indication of a clipping level associated with the reference signal based on transmitting the capability indicator. The operations of 1510 may be performed according to the methods described herein. In some examples, aspects of the operations of 1510 may be performed by a clipping level manager as described with reference to FIGS. 6 through 9.

At 1515, the receiving device may receive the reference signal from the transmitting device, where the reference signal is distorted based on the clipping level. The operations of 1515 may be performed according to the methods described herein. In some examples, aspects of the operations of 1515 may be performed by a reference signal manager as described with reference to FIGS. 6 through 9.

At 1520, the receiving device may perform a reconstruction procedure for the reference signal based on the indication of the clipping level, where the reconstruction procedure includes one or more iterations. The operations of 1520 may be performed according to the methods described herein. In some examples, aspects of the operations of 1520 may be performed by a reconstruction manager as described with reference to FIGS. 6 through 9.

At 1525, the receiving device may determine a channel estimate associated with the reference signal based on the reconstruction procedure. The operations of 1525 may be performed according to the methods described herein. In some examples, aspects of the operations of 1525 may be performed by a channel estimation manager as described with reference to FIGS. 6 through 9.

At 1530, the receiving device may communicate with the transmitting device based on the channel estimate. The operations of 1530 may be performed according to the methods described herein. In some examples, aspects of the operations of 1530 may be performed by a data manager as described with reference to FIGS. 6 through 9.

Figure 16:
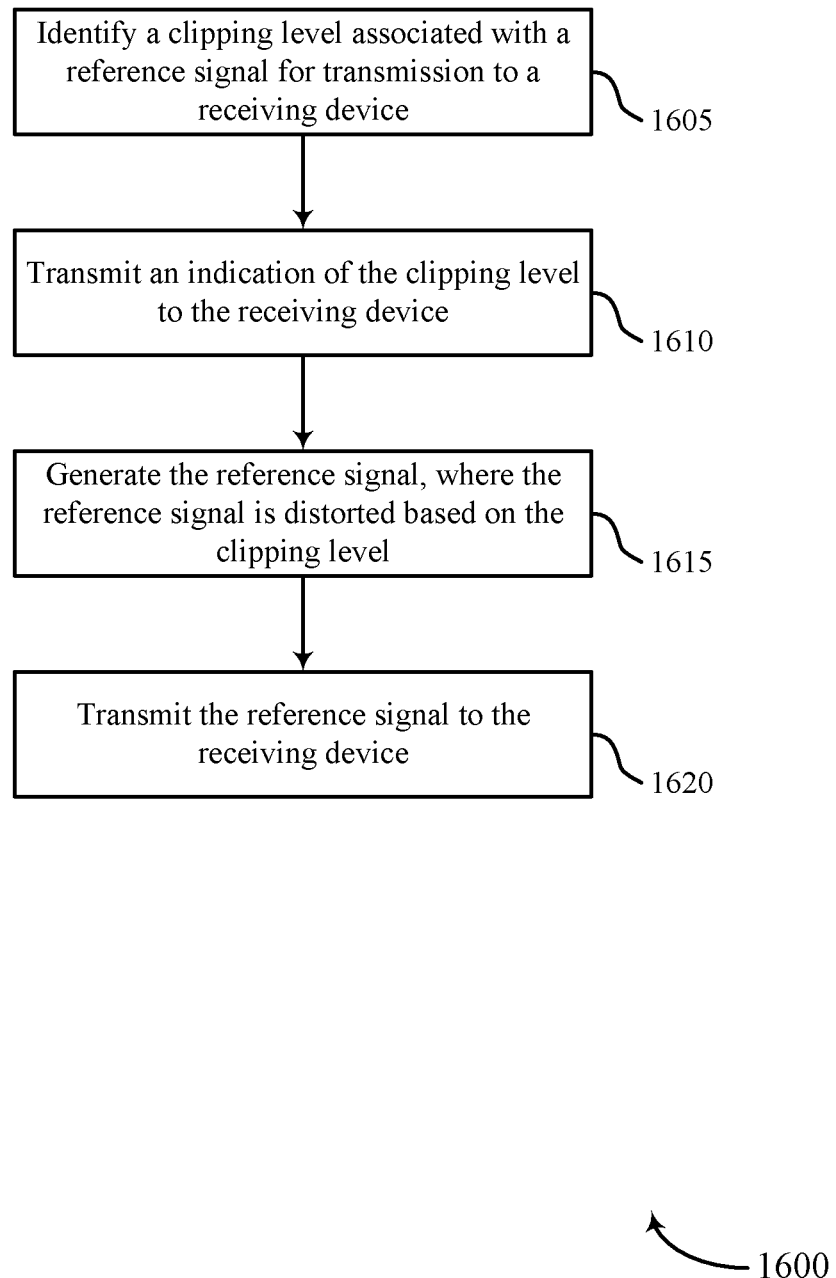

FIG. 16 shows a flowchart illustrating a method 1600 that supports iterative reference signal symbol reconstruction and channel estimation in accordance with aspects of the present disclosure. The operations of method 1600 may be implemented by a transmitting device (e.g., a UE 115 or a base station 105) or its components as described herein. For example, the operations of method 1600 may be performed by a communications manager as described with reference to FIGS. 10 through 13. In some examples, a transmitting device may execute a set of instructions to control the functional elements of the transmitting device to perform the functions described herein. Additionally or alternatively, a transmitting device may perform aspects of the functions described herein using special-purpose hardware.

At 1605, the transmitting device may identify a clipping level associated with a reference signal for transmission to a receiving device. The operations of 1605 may be performed according to the methods described herein. In some examples, aspects of the operations of 1605 may be performed by a clipping level component as described with reference to FIGS. 10 through 13.

At 1610, the transmitting device may transmit an indication of the clipping level to the receiving device. The operations of 1610 may be performed according to the methods described herein. In some examples, aspects of the operations of 1610 may be performed by a clipping level indication manager as described with reference to FIGS. 10 through 13.

At 1615, the transmitting device may generate the reference signal, where the reference signal is distorted based on the clipping level. The operations of 1615 may be performed according to the methods described herein. In some examples, aspects of the operations of 1615 may be performed by a reference signal generation component as described with reference to FIGS. 10 through 13.

At 1620, the transmitting device may transmit the reference signal to the receiving device. The operations of 1620 may be performed according to the methods described herein. In some examples, aspects of the operations of 1620 may be performed by a reference signal transmission manager as described with reference to FIGS. 10 through 13.

Figure 17:
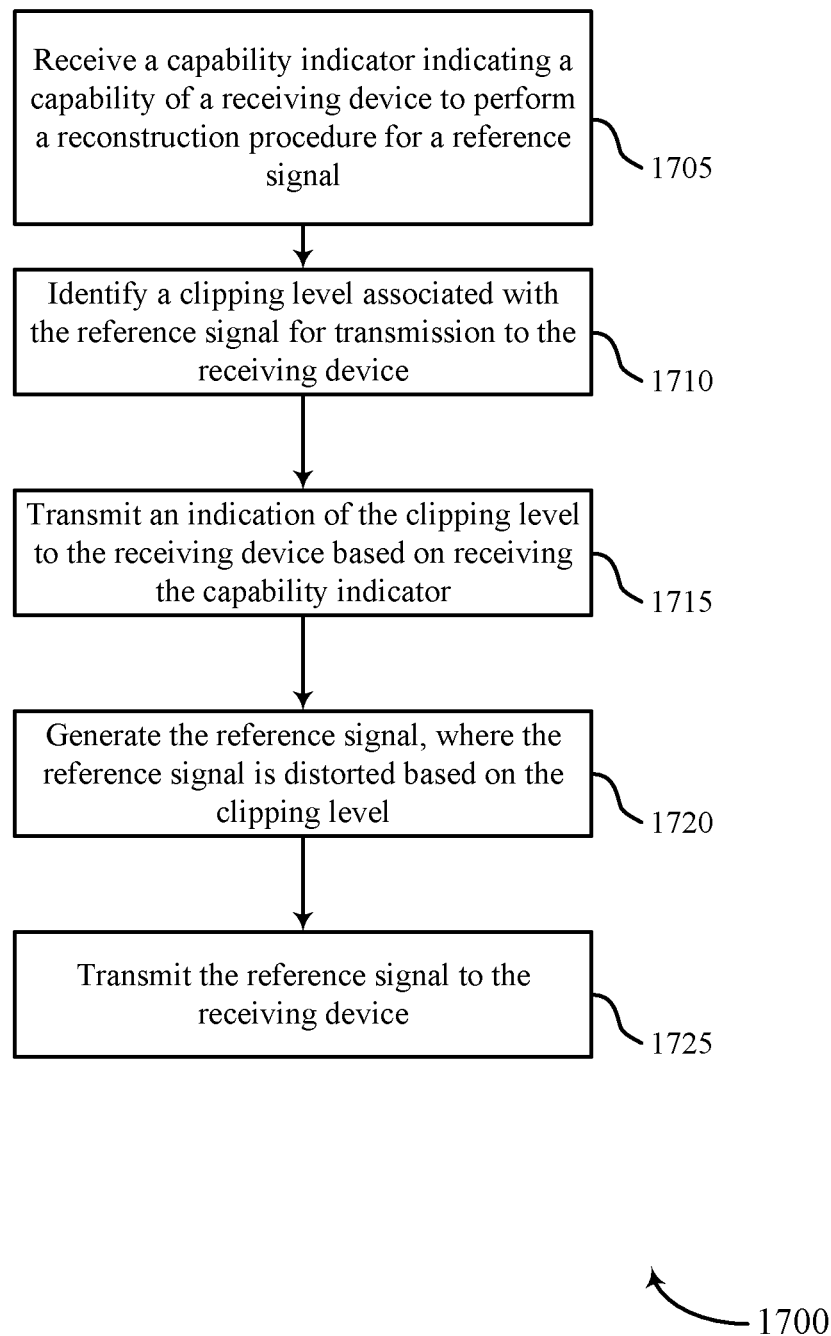

FIG. 17 shows a flowchart illustrating a method 1700 that supports iterative reference signal symbol reconstruction and channel estimation in accordance with aspects of the present disclosure. The operations of method 1700 may be implemented by a transmitting device (e.g., a UE 115 or a base station 105) or its components as described herein. For example, the operations of method 1700 may be performed by a communications manager as described with reference to FIGS. 10 through 13. In some examples, a transmitting device may execute a set of instructions to control the functional elements of the transmitting device to perform the functions described herein. Additionally or alternatively, a transmitting device may perform aspects of the functions described herein using special-purpose hardware.

At 1705, the transmitting device may receive a capability indicator indicating a capability of a receiving device to perform a reconstruction procedure for a reference signal. The operations of 1705 may be performed according to the methods described herein. In some examples, aspects of the operations of 1705 may be performed by a capability indication component as described with reference to FIGS. 10 through 13.

At 1710, the transmitting device may identify a clipping level associated with the reference signal for transmission to the receiving device. The operations of 1710 may be performed according to the methods described herein. In some examples, aspects of the operations of 1710 may be performed by a clipping level component as described with reference to FIGS. 10 through 13.

At 1715, the transmitting device may transmit an indication of the clipping level to the receiving device based on receiving the capability indicator. The operations of 1715 may be performed according to the methods described herein. In some examples, aspects of the operations of 1715 may be performed by a clipping level indication manager as described with reference to FIGS. 10 through 13.

At 1720, the transmitting device may generate the reference signal, where the reference signal is distorted based on the clipping level. The operations of 1720 may be performed according to the methods described herein. In some examples, aspects of the operations of 1720 may be performed by a reference signal generation component as described with reference to FIGS. 10 through 13.

At 1725, the transmitting device may transmit the reference signal to the receiving device. The operations of 1725 may be performed according to the methods described herein. In some examples, aspects of the operations of 1725 may be performed by a reference signal transmission manager as described with reference to FIGS. 10 through 13.

The following provides an overview of aspects of the present disclosure:

Aspect 1: A method for wireless communications at a receiving device, comprising: receiving, from a transmitting device, an indication of a clipping level associated with a reference signal; receiving the reference signal from the transmitting device, wherein the reference signal is distorted based at least in part on the clipping level; performing a reconstruction procedure for the reference signal based at least in part on the indication of the clipping level, wherein the reconstruction procedure comprises one or more iterations; determining a channel estimate associated with the reference signal based at least in part on the reconstruction procedure; and communicating with the transmitting device based at least in part on the channel estimate.

Aspect 2: The method of aspect 1, further comprising: transmitting a capability indicator that indicates a capability of the receiving device to perform the reconstruction procedure for the reference signal, wherein receiving the indication of the clipping level is based at least in part on transmitting the capability indicator.

Aspect 3: The method of any of aspects 1 or 2, wherein communicating with the transmitting device based at least in part on the channel estimate comprises: receiving, from the transmitting device, a second signal that is distorted based at least in part on the clipping level; generating a reconstructed signal based at least in part on the second signal and the channel estimate; and decoding the reconstructed signal.

Aspect 4: The method of any of aspects 1 to 3, wherein generating the reconstructed signal comprises: equalizing the second signal based at least in part on the channel estimate.

Aspect 5: The method of any of aspects 1 to 4, wherein generating the reconstructed signal comprises: receiving, from the transmitting device, information associated with peaks clipped from the second signal; and reconstructing one or more peaks of the second signal based at least in part on the information.

Aspect 6: The method of any of aspects 1 to 5, wherein the second signal is received via a data channel.

Aspect 7: the method of any of aspects 1 to 6, wherein each iteration of the one or more iterations of the reconstruction procedure comprises: determining a first set of symbols for the reference signal based at least in part on the received reference signal or a prior iteration of the reconstruction procedure; determining a first set of channel coefficients based at least in part on the first set of symbols; equalizing the first set of channel coefficients to obtain an equalized set of channel coefficients; and determining a set of candidate samples for the reference signal based at least in part on the first set of symbols and the equalized set of channel coefficients.

Aspect 8: The method of any of aspects 1 to 7, wherein each iteration of the one or more iterations of the reconstruction procedure further comprises: reconstructing one or more peaks of the reference signal based at least in part on the set of candidate samples and the clipping level, and determining a set of reconstructed samples for the reference signal based at least in part on reconstructing the one or more peaks.

Aspect 9: The method of any of aspects 1 to 8, wherein each iteration of the one or more iterations of the reconstruction procedure further comprises: determining a second set of symbols for the reference signal based at least in part on the set of reconstructed samples and the first set of channel coefficients.

Aspect 10: The method of any of aspects 1 to 9, wherein reconstructing the one or more peaks of the reference signal comprises: identifying one or more candidate samples of the set of candidate samples as below the clipping level; identifying, for the one or more candidate samples identified as below the clipping level, respective known samples associated with the reference signal; determining that one or more of the respective known samples are above the clipping level; and substituting the one or more respective known samples that are above the clipping level for corresponding candidate samples.

Aspect 11: The method of any of aspects 1 to 10, wherein determining the channel estimate comprises: obtaining a reconstructed set of symbols for the reference signal based at least in part on an iteration of the reconstruction procedure; and determining a set of channel coefficients based at least in part on the reconstructed set of symbols.

Aspect 12: The method of any of aspects 1 to 11, wherein the clipping level corresponds to an amplitude beyond which the reference signal is clipped.

Aspect 13: The method of any of aspects 1 to 12, wherein the indication of the clipping level is received via a control channel, a data channel, or both.

Aspect 14: The method of any of aspects 1 to 13, wherein the reference signal comprises a demodulation reference signal.

Aspect 15: An apparatus, comprising means for performing a method of any of aspects 1 to 14.

Aspect 16: An apparatus for wireless communications comprising a processor; memory in electronic communication with the processor; and instructions stored in the memory and executable by the processor to cause the apparatus to perform a method of any of aspects 1 to 14.

Aspect 17: A non-transitory computer-readable medium storing code for wireless communications, the code comprising instructions executable by a processor to perform a method of any of aspects 1 to 14.

Aspect 18: A method for wireless communications at a transmitting device, comprising: identifying a clipping level associated with a reference signal for transmission to a receiving device; transmitting an indication of the clipping level to the receiving device; generating the reference signal, wherein the reference signal is distorted based at least in part on the clipping level; and transmitting the reference signal to the receiving device.

Aspect 19: The method of aspect 18, further comprising: receiving a capability indicator indicating a capability of the receiving device to perform a reconstruction procedure for the reference signal, wherein transmitting the indication of the clipping level is based at least in part on receiving the capability indicator.

Aspect 20: The method of any of aspects 18 or 19, further comprising: transmitting, to the receiving device, a second signal that is distorted based at least in part on the clipping level.

Aspect 21: The method of any of aspects 18 to 20, wherein the reference signal and the second signal are transmitted within a same transmission time interval.

Aspect 22: The method of any of aspects 18 to 21, wherein the second signal is transmitted via a data channel.

Aspect 23: The method of any of aspects 18 to 22, wherein transmitting the indication of the clipping level comprises: transmitting control signal indicating the clipping level.

Aspect 24: The method of any of aspects 18 to 23, wherein the control signaling is transmitted via a control channel, a data channel, or both.

Aspect 25: The method of any of aspects 18 to 24, wherein generating the reference signal comprises: clipping one or more samples of the reference signal, wherein all samples of the reference signal have an amplitude at or below the clipping level based at least in part on the clipping.

Aspect 26: The method of any of aspects 18 to 25, wherein the reference signal comprises a demodulation reference signal.

Aspect 27: An apparatus, comprising means for performing a method of any of aspects 18 to 26.

Aspect 28: An apparatus for wireless communications comprising a processor; memory in electronic communication with the processor; and instructions stored in the memory and executable by the processor to cause the apparatus to perform a method of any of aspects 18 to 26.

Aspect 29: A non-transitory computer-readable medium storing code for wireless communications, the code comprising instructions executable by a processor to perform a method of any of aspects 18 to 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a receiving device, comprising:
   receiving, from a transmitting device, an indication of an amplitude peak clipping level associated with a reference signal;
   receiving the reference signal from the transmitting device, wherein the reference signal is distorted based at least in part on the amplitude peak clipping level;
   performing a reconstruction procedure for the reference signal based at least in part on the indication of the amplitude peak clipping level, wherein the reconstruction procedure comprises one or more iterations;
   determining a channel estimate associated with the reference signal based at least in part on the reconstruction procedure; and
   communicating with the transmitting device based at least in part on the channel estimate by, at least in part:
   receiving, from the transmitting device, a second signal that is distorted based at least in part on the amplitude peak clipping level;
   generating a reconstructed signal based at least in part on the second signal and the channel estimate; and
   decoding the reconstructed signal.

2. The method of claim 1, further comprising:
   transmitting a capability indicator that indicates a capability of the receiving device to perform the reconstruction procedure for the reference signal, wherein receiving the indication of the amplitude peak clipping level is based at least in part on transmitting the capability indicator.

3. The method of claim 1, wherein generating the reconstructed signal comprises:
   equalizing the second signal based at least in part on the channel estimate.

4. The method of claim 1, wherein generating the reconstructed signal comprises:
   receiving, from the transmitting device, information associated with amplitude peaks clipped from the second signal; and
   reconstructing one or more amplitude peaks of the second signal based at least in part on the information.

5. The method of claim 1, wherein the second signal is received via a data channel.

6. A method for wireless communications at a receiving device, comprising:
   receiving, from a transmitting device, an indication of an amplitude peak clipping level associated with a reference signal;
   receiving the reference signal from the transmitting device, wherein the reference signal is distorted based at least in part on the amplitude peak clipping level;
   performing a reconstruction procedure for the reference signal based at least in part on the indication of the amplitude peak clipping level, wherein the reconstruction procedure comprises one or more iterations;
   determining a channel estimate associated with the reference signal based at least in part on the reconstruction procedure;
   communicating with the transmitting device based at least in part on the channel estimate; and
   wherein, for each iteration of the one or more iterations, the reconstruction procedure comprises:
   determining a first set of symbols for the reference signal based at least in part on the received reference signal or a prior iteration of the reconstruction procedure;
   determining a first set of channel coefficients based at least in part on the first set of symbols;
   equalizing the first set of channel coefficients to obtain an equalized set of channel coefficients; and
   determining a set of candidate samples for the reference signal based at least in part on the first set of symbols and the equalized set of channel coefficients.

7. The method of claim 6, wherein, for each iteration of the one or more iterations, the reconstruction procedure further comprises:
   reconstructing one or more amplitude peaks of the reference signal based at least in part on the set of candidate samples and the amplitude peak clipping level; and
   determining a set of reconstructed samples for the reference signal based at least in part on reconstructing the one or more amplitude peaks.

8. The method of claim 7, wherein, for each iteration of the one or more iterations, the reconstruction procedure further comprises:
   determining a second set of symbols for the reference signal based at least in part on the set of reconstructed samples and the first set of channel coefficients.

9. The method of claim 7, wherein reconstructing the one or more amplitude peaks of the reference signal comprises:
   identifying one or more candidate samples of the set of candidate samples as below the amplitude peak clipping level;
   identifying, for the one or more candidate samples identified as below the amplitude peak clipping level, respective known samples associated with the reference signal;
   determining that one or more of the respective known samples are above the amplitude peak clipping level; and
   substituting the respective known samples that are above the amplitude peak clipping level for corresponding candidate samples.

10. A method for wireless communications at a receiving device, comprising:
    receiving, from a transmitting device, an indication of an amplitude peak clipping level associated with a reference signal;
    receiving the reference signal from the transmitting device, wherein the reference signal is distorted based at least in part on the amplitude peak clipping level;

performing a reconstruction procedure for the reference signal based at least in part on the indication of the amplitude peak clipping level, wherein the reconstruction procedure comprises one or more iterations;
determining a channel estimate associated with the reference signal based at least in part on the reconstruction procedure;
communicating with the transmitting device based at least in part on the channel estimate; and
wherein the determining the channel estimate comprises:
obtaining a reconstructed set of symbols for the reference signal based at least in part on an iteration of the reconstruction procedure; and
determining a set of channel coefficients based at least in part on the reconstructed set of symbols.

11. A method for wireless communications at a receiving device, comprising:
receiving, from a transmitting device, an indication of an amplitude peak clipping level associated with a reference signal;
receiving the reference signal from the transmitting device, wherein the reference signal is distorted based at least in part on the amplitude peak clipping level;
performing a reconstruction procedure for the reference signal based at least in part on the indication of the amplitude peak clipping level, wherein the reconstruction procedure comprises one or more iterations;
determining a channel estimate associated with the reference signal based at least in part on the reconstruction procedure;
communicating with the transmitting device based at least in part on the channel estimate; and
wherein the amplitude peak clipping level corresponds to an amplitude beyond which the reference signal is clipped.

12. A method for wireless communications at a receiving device, comprising:
receiving, from a transmitting device, an indication of an amplitude peak clipping level associated with a reference signal;
receiving the reference signal from the transmitting device, wherein the reference signal is distorted based at least in part on the amplitude peak clipping level;
performing a reconstruction procedure for the reference signal based at least in part on the indication of the amplitude peak clipping level, wherein the reconstruction procedure comprises one or more iterations;
determining a channel estimate associated with the reference signal based at least in part on the reconstruction procedure;
communicating with the transmitting device based at least in part on the channel estimate; and
wherein the reference signal comprises a demodulation reference signal.

13. The method of claim 12, wherein the indication of the amplitude peak clipping level is received via a control channel, a data channel, or both.

14. A method for wireless communications at a transmitting device, comprising:
identifying an amplitude peak clipping level associated with a reference signal for transmission to a receiving device;
transmitting an indication of the amplitude peak clipping level to the receiving device;
generating the reference signal, wherein the reference signal is distorted based at least in part on the amplitude peak clipping level;
transmitting the reference signal to the receiving device; and
transmitting, to the receiving device, a second signal that is distorted based at least in part on the amplitude peak clipping level.

15. The method of claim 14, further comprising:
receiving a capability indicator indicating a capability of the receiving device to perform a reconstruction procedure for the reference signal, wherein transmitting the indication of the amplitude peak clipping level is based at least in part on receiving the capability indicator.

16. The method of claim 14, wherein the reference signal and the second signal are transmitted within a same transmission time interval.

17. The method of claim 14, wherein the second signal is transmitted via a data channel.

18. The method of claim 14, wherein transmitting the indication of the amplitude peak clipping level comprises:
transmitting control signaling indicating the amplitude peak clipping level.

19. The method of claim 18, wherein the control signaling is transmitted via a control channel, a data channel, or both.

20. A method for wireless communications at a transmitting device, comprising:
identifying an amplitude peak clipping level associated with a reference signal for transmission to a receiving device;
transmitting an indication of the amplitude peak clipping level to the receiving device;
generating the reference signal, wherein the reference signal is distorted based at least in part on the amplitude peak clipping level; and
transmitting the reference signal to the receiving device; and
wherein generating the reference signal further comprises:
clipping one or more samples of the reference signal, wherein all samples of the reference signal have an amplitude peak at or below the amplitude peak clipping level based at least in part on the clipping.

21. A method for wireless communications at a transmitting device, comprising:
identifying an amplitude peak clipping level associated with a reference signal for transmission to a receiving device;
transmitting an indication of the amplitude peak clipping level to the receiving device;
generating the reference signal, wherein the reference signal is distorted based at least in part on the amplitude peak clipping level; and
transmitting the reference signal to the receiving device, wherein the reference signal comprises a demodulation reference signal.

22. An apparatus for wireless communications at a receiving device, comprising:
a processor;
a transceiver coupled with the processor;
memory coupled with the processor; and
instructions stored in the memory and executable by the processor to cause the apparatus to:
receive, from a transmitting device via the transceiver, an indication of an amplitude peak clipping level associated with a reference signal;
receive the reference signal from the transmitting device via the transceiver, wherein the reference signal is distorted based at least in part on the amplitude peak clipping level;

perform a reconstruction procedure for the reference signal based at least in part on the indication of the amplitude peak clipping level, wherein the reconstruction procedure comprises one or more iterations;

determine a channel estimate associated with the reference signal based at least in part on the reconstruction procedure; and communicate with the transmitting device via the transceiver based at least in part on the channel estimate, and wherein the instructions to communicate with the transmitting device via the transceiver based at least in part on the channel estimate are executable by the processor to cause the apparatus to:

receive, from the transmitting device via the transceiver, a second signal that is distorted based at least in part on the amplitude peak clipping level;

generate a reconstructed signal based at least in part on the second signal and the channel estimate; and decode the reconstructed signal.

23. The apparatus of claim 22, wherein the instructions are further executable by the processor to cause the apparatus to:

transmit, via the transceiver, a capability indicator that indicates a capability of the receiving device to perform the reconstruction procedure for the reference signal, wherein receiving the indication of the amplitude peak clipping level is based at least in part on transmitting the capability indicator.

24. The apparatus of claim 22, wherein the instructions to generate the reconstructed signal are executable by the processor to cause the apparatus to:

equalize the second signal based at least in part on the channel estimate.

25. The apparatus of claim 22, wherein the instructions to generate the reconstructed signal are executable by the processor to cause the apparatus to:

receive, from the transmitting device, information associated with amplitude peaks clipped from the second signal; and reconstruct one or more amplitude peaks of the second signal based at least in part on the information.

26. The apparatus of claim 22, wherein the second signal is received via a data channel.

27. An apparatus for wireless communications at a receiving device, comprising:

a processor;

a transceiver coupled with the processor;

memory coupled with the processor; and instructions stored in the memory and executable by the processor to cause the apparatus to:

receive, from a transmitting device via the transceiver, an indication of an amplitude peak clipping level associated with a reference signal;

receive the reference signal from the transmitting device via the transceiver, wherein the reference signal is distorted based at least in part on the amplitude peak clipping level;

perform a reconstruction procedure for the reference signal based at least in part on the indication of the amplitude peak clipping level, wherein the reconstruction procedure comprises one or more iterations;

determine a channel estimate associated with the reference signal based at least in part on the reconstruction procedure; and communicate with the transmitting device via the transceiver based at least in part on the channel estimate; and wherein, for each iteration of the one or more iterations, to perform the reconstruction procedure the instructions are executable by the processor to cause the apparatus to:

determine a first set of symbols for the reference signal based at least in part on the received reference signal or a prior iteration of the reconstruction procedure;

determine a first set of channel coefficients based at least in part on the first set of symbols;

equalize the first set of channel coefficients to obtain an equalized set of channel coefficients; and determine a set of candidate samples for the reference signal based at least in part on the first set of symbols and the equalized set of channel coefficients.

28. The apparatus of claim 27, wherein each iteration of the one or more iterations of the reconstruction procedure further comprises:

reconstruct one or more amplitude peaks of the reference signal based at least in part on the set of candidate samples and the amplitude peak clipping level; and determine a set of reconstructed samples for the reference signal based at least in part on reconstructing the one or more amplitude peaks.

29. The apparatus of claim 28, wherein each iteration of the one or more iterations of the reconstruction procedure further comprises:

determine a second set of symbols for the reference signal based at least in part on the set of reconstructed samples and the first set of channel coefficients.

30. The apparatus of claim 28, wherein the instructions to reconstruct the one or more amplitude peaks of the reference signal are executable by the processor to cause the apparatus to:

identify one or more candidate samples of the set of candidate samples as below the amplitude peak clipping level;

identify, for the one or more candidate samples identified as below the amplitude peak clipping level, respective known samples associated with the reference signal;

determine that one or more of the respective known samples are above the amplitude peak clipping level; and substitute the respective known samples that are above the amplitude peak clipping level for corresponding candidate samples.

31. An apparatus for wireless communications at a receiving device, comprising:

a processor;

a transceiver coupled with the processor;

memory coupled with the processor; and instructions stored in the memory and executable by the processor to cause the apparatus to:

receive, from a transmitting device via the transceiver, an indication of an amplitude peak clipping level associated with a reference signal;

receive the reference signal from the transmitting device via the transceiver, wherein the reference signal is distorted based at least in part on the amplitude peak clipping level;

perform a reconstruction procedure for the reference signal based at least in part on the indication of the amplitude peak clipping level, wherein the reconstruction procedure comprises one or more iterations;

determine a channel estimate associated with the reference signal based at least in part on the reconstruction procedure; and communicate with the transmitting device via the transceiver based at least in part on the channel estimate; and wherein the instructions to determine the channel estimate are executable by the processor to cause the apparatus to:

obtain a reconstructed set of symbols for the reference signal based at least in part on an iteration of the reconstruction procedure; and determine a set of channel coefficients based at least in part on the reconstructed set of symbols.

32. An apparatus for wireless communications at a receiving device, comprising:

a processor;
a transceiver coupled with the processor;
memory coupled with the processor; and
instructions stored in the memory and executable by the processor to cause the apparatus to:

receive, from a transmitting device via the transceiver, an indication of an amplitude peak clipping level associated with a reference signal;

receive the reference signal from the transmitting device via the transceiver, wherein the reference signal is distorted based at least in part on the amplitude peak clipping level;

perform a reconstruction procedure for the reference signal based at least in part on the indication of the amplitude peak clipping level, wherein the reconstruction procedure comprises one or more iterations;

determine a channel estimate associated with the reference signal based at least in part on the reconstruction procedure; and communicate with the transmitting device via the transceiver based at least in part on the channel estimate; and wherein the amplitude peak clipping level corresponds to an amplitude beyond which the reference signal is clipped.

33. An apparatus for wireless communications at a receiving device, comprising:

a processor;
a transceiver coupled with the processor;
memory coupled with the processor; and
instructions stored in the memory and executable by the processor to cause the apparatus to:

receive, from a transmitting device via the transceiver, an indication of an amplitude peak clipping level associated with a reference signal;

receive the reference signal from the transmitting device via the transceiver, wherein the reference signal is distorted based at least in part on the amplitude peak clipping level;

perform a reconstruction procedure for the reference signal based at least in part on the indication of the amplitude peak clipping level, wherein the reconstruction procedure comprises one or more iterations;

determine a channel estimate associated with the reference signal based at least in part on the reconstruction procedure; and communicate with the transmitting device via the transceiver based at least in part on the channel estimate; and wherein the reference signal comprises a demodulation reference signal.

34. The apparatus of claim 33, wherein the indication of the amplitude peak clipping level is received via a control channel, a data channel, or both.

35. An apparatus for wireless communications at a transmitting device, comprising:

a processor;
a transceiver coupled with the processor;
memory coupled with the processor; and
instructions stored in the memory and executable by the processor to cause the apparatus to:

identify an amplitude peak clipping level associated with a reference signal for transmission to a receiving device;

transmit an indication of the amplitude peak clipping level to the receiving device via the transceiver;

generate the reference signal, wherein the reference signal is distorted based at least in part on the amplitude peak clipping level;

transmit the reference signal to the receiving device via the transceiver; and transmit, to the receiving device via the transceiver, a second signal that is distorted based at least in part on the amplitude peak clipping level.

36. The apparatus of claim 35, wherein the instructions are further executable by the processor to cause the apparatus to:

receive a capability indicator indicating a capability of the receiving device to perform a reconstruction procedure for the reference signal, wherein transmitting the indication of the amplitude peak clipping level is based at least in part on receiving the capability indicator.

37. The apparatus of claim 35, wherein the reference signal and the second signal are transmitted within a same transmission time interval.

38. The apparatus of claim 35, wherein the second signal is transmitted via a data channel.

39. The apparatus of claim 35, wherein the instructions to transmit the indication of the amplitude peak clipping level are executable by the processor to cause the apparatus to:

transmit, via the transceiver, control signaling indicating the amplitude peak clipping level.

40. The apparatus of claim 39, wherein the control signaling is transmitted via a control channel, a data channel, or both.

41. An apparatus for wireless communications at a transmitting device, comprising:

a processor;
a transceiver coupled with the processor;
memory coupled with the processor; and
instructions stored in the memory and executable by the processor to cause the apparatus to:

identify an amplitude peak clipping level associated with a reference signal for transmission to a receiving device;

transmit an indication of the amplitude peak clipping level to the receiving device via the transceiver;

generate the reference signal, wherein the reference signal is distorted based at least in part on the amplitude peak clipping level;

transmit the reference signal to the receiving device via the transceiver; and wherein the instructions to generate the reference signal are executable by the processor to cause the apparatus to:

clip one or more samples of the reference signal, wherein all samples of the reference signal have an amplitude peak at or below the amplitude peak clipping level based at least in part on the clipping.

42. An apparatus for wireless communications at a transmitting device, comprising:

a processor;

a transceiver coupled with the processor;

memory coupled with the processor; and instructions stored in the memory and executable by the processor to cause the apparatus to:

identify an amplitude peak clipping level associated with a reference signal for transmission to a receiving device;

transmit an indication of the amplitude peak clipping level to the receiving device via the transceiver;

generate the reference signal, wherein the reference signal is distorted based at least in part on the amplitude peak clipping level;

transmit the reference signal to the receiving device via the transceiver; and wherein the reference signal comprises a demodulation reference signal.

43. An apparatus for wireless communications at a receiving device, comprising:

means for receiving, from a transmitting device, an indication of an amplitude peak clipping level associated with a reference signal;

means for receiving the reference signal from the transmitting device, wherein the reference signal is distorted based at least in part on the amplitude peak clipping level;

means for performing a reconstruction procedure for the reference signal based at least in part on the indication of the amplitude peak clipping level, wherein the reconstruction procedure comprises one or more iterations;

means for determining a channel estimate associated with the reference signal based at least in part on the reconstruction procedure; and means for communicating with the transmitting device based at least in part on the channel estimate; and wherein the reference signal comprises a demodulation reference signal.

44. An apparatus for wireless communications at a transmitting device, comprising:

means for identifying an amplitude peak clipping level associated with a reference signal for transmission to a receiving device;

means for transmitting an indication of the amplitude peak clipping level to the receiving device;

means for generating the reference signal, wherein the reference signal is distorted based at least in part on the amplitude peak clipping level;

means for transmitting the reference signal to the receiving device; and means for transmitting a second signal that is distorted based at least in part on the amplitude peak clipping level.

45. A non-transitory computer-readable medium storing code for wireless communications at a receiving device, the code comprising instructions executable by a processor to:

receive, from a transmitting device, an indication of an amplitude peak clipping level associated with a reference signal;

receive the reference signal from the transmitting device, wherein the reference signal is distorted based at least in part on the amplitude peak clipping level;

perform a reconstruction procedure for the reference signal based at least in part on the indication of the amplitude peak clipping level, wherein the reconstruction procedure comprises one or more iterations;

determine a channel estimate associated with the reference signal based at least in part on the reconstruction procedure;

communicate with the transmitting device based at least in part on the channel estimate; and wherein the amplitude peak clipping level corresponds to an amplitude beyond which the reference signal is clipped.

46. A non-transitory computer-readable medium storing code for wireless communications at a transmitting device, the code comprising instructions executable by a processor to:

identify an amplitude peak clipping level associated with a reference signal for transmission to a receiving device;

transmit an indication of the amplitude peak clipping level to the receiving device;

generate the reference signal, wherein the reference signal is distorted based at least in part on the amplitude peak clipping level;

transmit the reference signal to the receiving device; and wherein the reference signal comprises a demodulation reference signal.

* * * * *